United States Patent
Ryu et al.

(10) Patent No.: US 11,653,808 B2
(45) Date of Patent: May 23, 2023

(54) ROBOT CLEANER AND CONTROLLING METHOD THEREOF

(71) Applicant: Samsung Electronics Co., Ltd., Suwon-si (KR)

(72) Inventors: Minwoo Ryu, Suwon-si (KR); Changho Ha, Suwon-si (KR); Jinhee Kim, Suwon-si (KR); Shin Kim, Suwon-si (KR); Donghun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 17/221,432

(22) Filed: Apr. 2, 2021

(65) Prior Publication Data
US 2021/0330164 A1   Oct. 28, 2021

(30) Foreign Application Priority Data
Apr. 22, 2020   (KR) ........................ 10-2020-0048745

(51) Int. Cl.
*G05D 1/02* (2020.01)
*A47L 11/40* (2006.01)
(Continued)

(52) U.S. Cl.
CPC .......... *A47L 11/4011* (2013.01); *G05D 1/027* (2013.01); *G05D 1/0214* (2013.01);
(Continued)

(58) Field of Classification Search
CPC ............. A47L 11/4011; A47L 2201/04; A47L 9/2826; A47L 9/2852; A47L 9/2805;
(Continued)

(56) References Cited

U.S. PATENT DOCUMENTS

| | | | |
|---|---|---|---|
| 9,271,621 B2 | 3/2016 | Park et al. | |
| 10,133,930 B2 | 11/2018 | Noh et al. | |

(Continued)

FOREIGN PATENT DOCUMENTS

| | | | |
|---|---|---|---|
| CA | 2 902 430 A1 | 9/2014 | |
| EP | 3 257 420 A1 | 12/2017 | |

(Continued)

OTHER PUBLICATIONS

International Search Report with Written Opinion dated Jul. 15, 2021; International Appln. No. PCT/KR2021/003999.
(Continued)

*Primary Examiner* — Bao Long T Nguyen
(74) *Attorney, Agent, or Firm* — Jefferson IP Law, LLP

(57) ABSTRACT

A robot cleaner is provided. The robot cleaner includes a three-dimensional image sensor, an optical sensor, a gyro sensor, and at least one processor configured to control a driving state of the robot cleaner based on image data acquired by the three-dimensional image sensor, optical data acquired by the optical sensor, and angular velocity data acquired by the gyro sensor, wherein the three-dimensional image sensor and the optical sensor are respectively arranged to be tilted by a predetermined tilting angle, and a tilting angle of the three-dimensional image sensor is smaller than a tilting angle of the optical sensor.

20 Claims, 27 Drawing Sheets

(51) Int. Cl.
*G06V 20/10* (2022.01)
*G06V 20/64* (2022.01)

(52) U.S. Cl.
CPC ........... *G05D 1/0246* (2013.01); *G06V 20/10* (2022.01); *G06V 20/64* (2022.01); *A47L 2201/04* (2013.01); *G05D 2201/0215* (2013.01)

(58) Field of Classification Search
CPC .... G05D 1/0214; G05D 1/0246; G05D 1/027; G05D 2201/0215; G05D 1/0238; G05D 2201/0203; G05D 1/0248; G05D 1/024; G05D 1/0231; G06V 20/10; G06V 20/64; G06V 20/56
See application file for complete search history.

(56) References Cited

U.S. PATENT DOCUMENTS

| | | |
|---|---|---|
| 10,869,019 B2 | 12/2020 | Kim |
| 2008/0294288 A1 | 11/2008 | Yamauchi |
| 2016/0144512 A1 | 5/2016 | Kim |
| 2018/0113467 A1 | 4/2018 | Kim |
| 2018/0189565 A1* | 7/2018 | Lukierski ........... H04N 5/23238 |
| 2019/0302793 A1 | 10/2019 | Leech et al. |
| 2019/0320867 A1* | 10/2019 | Noh ........................ B25J 9/1674 |
| 2020/0236339 A1 | 7/2020 | Kim |
| 2020/0409382 A1* | 12/2020 | Herman ..................... A47L 9/30 |
| 2022/0175210 A1* | 6/2022 | Choi ..................... A47L 9/2852 |

FOREIGN PATENT DOCUMENTS

| | | |
|---|---|---|
| KR | 10-2006-0047030 A | 5/2006 |
| KR | 10-2014-0074157 A | 6/2014 |
| KR | 10-2014-0109172 A | 9/2014 |
| KR | 10-2016-0043841 A | 4/2016 |
| KR | 10-2016-0100981 A | 8/2016 |
| KR | 10-2017-0103556 A | 9/2017 |
| KR | 10-1851587 B1 | 5/2018 |
| KR | 10-1995344 B1 | 7/2019 |
| KR | 10-2020-0117772 A | 10/2020 |
| WO | 2014/064990 A1 | 5/2014 |
| WO | 2015/090405 A1 | 6/2015 |

OTHER PUBLICATIONS

European Search Report dated Dec. 12, 2022; European Appln. No. 21793092.4-1205 / 4057880 PCT/KR2021003999.

* cited by examiner

2410 — $H_S = D_{min} * \tan(\theta_{pitch} + 0.5 * \theta_{VFOV})$

2415 — $\theta_{pitch} = \tan^{-1}(\frac{H_S}{D_{min}}) - 0.5 * \theta_{VFOV}$

2420 — $D_{upper} = \frac{H_R - H_S}{\tan(0.5 * \theta_{VFOV} - \theta_{pitch})}$

ROBOT CLEANER AND CONTROLLING METHOD THEREOF

CROSS-REFERENCE TO RELATED APPLICATION(S)

This application is based on and claims priority under 35 U.S.C. § 119(a) of a Korean patent application number 10-2020-0048745, filed on Apr. 22, 2020, in the Korean Intellectual Property Office, the disclosure of which is incorporated by reference herein in its entirety.

BACKGROUND

1. Field

The disclosure relates to a robot cleaner and a controlling method thereof. More particularly, the disclosure relates to a robot cleaner that acquires spatial information by using a three-dimensional image sensor and controls a driving state based on the acquired spatial information, and a controlling method thereof.

2. Description of Related Art

A robot cleaner may run based on two-dimensional spatial data. For example, a robot cleaner may acquire two-dimensional spatial data based on data acquired by using an ultrasonic sensor or an infrared sensor, etc. Then, the robot cleaner may set a driving path of the robot cleaner based on the two-dimensional spatial data.

In addition, a robot cleaner may identify an object that exists on a driving path and avoid the object. In the case of setting a driving path based on conventional two-dimensional spatial data, a robot cleaner may only determine whether an identified object is a subject to be avoided.

In the case of analyzing two-dimensional spatial data, there is a problem in that it is difficult to identify an object existing in a blind spot. In case an object existing in a blind spot cannot be identified, there may be high possibility that a situation where a robot cleaner cannot run as collision, trapping, etc. may occur.

Here, for analyzing three-dimensional spatial data, a three-dimensional image sensor may be used. In the case of using a three-dimensional image sensor, the three-dimensional image sensor may be combined with the main body of a conventional robot cleaner.

A conventional three-dimensional image sensor describes a sensor that acquires only three-dimensional spatial information, or it may be a sensor that additionally acquires distance information that gives a three-dimensional effect to a two-dimensional image. A three-dimensional image sensor may be used in various fields. For example, a three-dimensional image sensor may be used in various electronic devices such as a drone, an autonomous vehicle, etc.

In case a three-dimensional image sensor is included in a robot cleaner and acquires spatial information, there may be a lot of blind zones as there are a lot of indoor spaces in the driving of the robot cleaner. In case there are a lot of blind zones, a problem that a three-dimensional image sensor cannot easily identify an object may occur. In addition, a three-dimensional image sensor may have a narrow field of view (FOV), and a problem that data acquired from a three-dimensional image sensor is distorted according to an arrangement structure may occur.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a robot cleaner that changes spatial information by using data acquired from a three-dimensional image sensor and data acquired from a separate sensor, and controls a driving state based on the changed spatial information, and a controlling method thereof.

Additional aspects will be set forth in part in the description which follows and, in part, will be apparent from the description, or may be learned by practice of the presented embodiments.

In accordance with an aspect of the disclosure, a robot cleaner for achieving the aforementioned purpose is provided. The robot cleaner includes a three-dimensional image sensor, an optical sensor, a gyro sensor, and at least one processor configured to control a driving state of the robot cleaner based on image data acquired by the three-dimensional image sensor, optical data acquired by the optical sensor, and angular velocity data acquired by the gyro sensor, wherein the three-dimensional image sensor and the optical sensor are respectively arranged to be tilted by a predetermined tilting angle, and the tilting angle by which the three-dimensional image sensor is tilted is smaller than the tilting angle by which the optical sensor is tilted.

In accordance with another aspect of the disclosure, a controlling method of a robot cleaner is provided. The controlling method includes the operations of acquiring image data by a three-dimensional image sensor, acquiring optical data by an optical sensor, acquiring angular velocity data by a gyro sensor, and controlling a driving state of the robot cleaner based on the acquired image data, the acquired optical data, and the acquired angular velocity data, wherein the three-dimensional image sensor and the optical sensor are respectively arranged to be tilted by a predetermined tilting angle, and the tilting angle by which the three-dimensional image sensor is tilted is smaller than the tilting angle by which the optical sensor is tilted.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
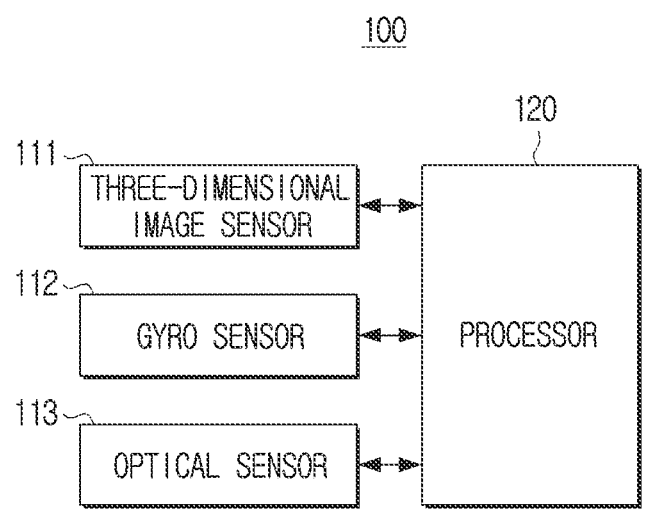
FIG. 1 is a block diagram illustrating a robot cleaner according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding in the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the," include plural referents unless the context clearly dictates otherwise. Thus, for example, reference to "a component surface" includes reference to one or more of such surfaces In addition, in this specification, expressions such as "have," "may have," "include," and "may include," denote the existence of such characteristics (e.g., elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like, used in this specification may be used to describe various elements regardless of any order and/or degree of importance. In addition, such expressions are used only to distinguish one element from another element, and are not intended to limit the elements.

The description in the disclosure that one element (e.g., a first element) is "(operatively or communicatively) coupled with/to" or "connected to" another element (e.g., a second element) should be interpreted to include both the case where the one element is directly coupled to the other element, and the case where the one element is coupled to the other element through another element (e.g., a third element).

In addition, singular expressions include plural expressions, unless defined obviously differently in the context. In addition, in the disclosure, terms such as "include" and "consist of" should be construed as designating that there are such characteristics, numbers, operations, elements, components, or a combination thereof described in the specification, but not as excluding in advance the existence or possibility of adding one or more of other characteristics, numbers, operations, elements, components, or a combination thereof.

Further, in the disclosure, "a module" or "a part" performs at least one function or operation, and it may be implemented as hardware or software, or as a combination of hardware and software. In addition, a plurality of "modules" or "parts" may be integrated into at least one module and implemented as at least one processor (not shown), except "modules" or "parts" which need to be implemented as specific hardware.

In addition, in this specification, the term "user" may refer to a person who uses an electronic device or a device using an electronic device (e.g., an artificial intelligence electronic device).

Hereinafter, an embodiment of the disclosure will be described in more detail with reference to the accompanying drawings.

FIG. 1 is a block diagram illustrating a robot cleaner according to an embodiment of the disclosure.

Referring to FIG. 1, a robot cleaner 100 may comprise a three-dimensional image sensor 111, a gyro sensor 112, an optical sensor 113, and at least one processor 120.

The robot cleaner 100 is a device that can perform autonomous driving, and in particular, the robot cleaner 100 may comprise an electronic device that identifies geographic features in surroundings and sets a path, and autonomously runs through the set path and cleans the surroundings.

The three-dimensional image sensor 111 may be a sensor that photographs an image. The three-dimensional image sensor 111 may acquire data necessary for acquiring three-dimensional spatial information. The three-dimensional image sensor 111 may acquire an image as input data, and generate three-dimensional spatial information as output data based on the input image. The three-dimensional image sensor 111 may comprise a sensor that additionally acquires distance information in a two-dimensional image.

The gyro sensor 112 may comprise a sensor that measures angular velocity. The gyro sensor 112 may measure a change in a direction based on location information and direction information of a rotating object. In addition, sensing data acquired from the gyro sensor 112 may be used in acquiring information related to a slope angle (or second angle or inclination angle).

The optical sensor 113 may comprise a sensor that detects light, and the robot cleaner 100 may acquire brightness information based on sensing data acquired from the optical sensor 113. For example, the optical sensor 113 may comprise at least one of an illumination sensor, an infrared sensor, an ultraviolet sensor, and/or a visible light sensor. Here, an infrared sensor may comprise a light-emitting part and a light-receiving part, and it may acquire sensing data by using a camera that can receive infrared rays reflected after emitting infrared rays, such as to the front side of the device.

The at least one processor 120 may perform overall control operations of the robot cleaner 100. Specifically, the at least one processor 120 performs a function of controlling the overall operations of the robot cleaner 100.

The at least one processor 120 may be implemented as a digital signal processor (DSP) processing digital signals, a microprocessor, and/or a time controller (TCON), or combination thereof. However, the disclosure is not limited thereto, and the at least one processor 120 may include one or more of a central processing unit (CPU), a micro controller unit (MCU), a micro processing unit (MPU), a controller, an application processor (AP), a graphics-processing unit (GPU) or a communication processor (CP), and an ARM processor, or may be otherwise defined by the terms. In addition, the at least one processor 120 may be implemented as a system on chip (SoC) having a processing algorithm stored therein or large-scale integration (LSI), or in the form of a field programmable gate array (FPGA). In addition, the at least one processor 120 may perform various functions by executing computer executable instructions stored in the memory.

The at least one processor 120 may control the driving state of the robot cleaner 100 based on at least one of the three-dimensional image sensor 111, the gyro sensor 112, the optical sensor 113, and image data acquired by the three-dimensional image sensor 111, optical data acquired by the optical sensor 113, or angular velocity data acquired by the gyro sensor 112. In addition, the three-dimensional image sensor 111 and the optical sensor 113 are respectively arranged to be tilted by a predetermined tilting angle (or first angle), and the tilting angle by which the three-dimensional image sensor 111 is tilted may be smaller than the tilting angle by which the optical sensor 113 is tilted. Detailed explanation regarding the tilting angles will be made later with reference to FIG. 25 and FIG. 26.

Here, the three-dimensional image sensor 111 may be arranged to be tilted by a tilting angle (or an arrangement angle) determined based on the arrangement height of the three-dimensional image sensor 111, the field of view of the three-dimensional image sensor 111, and the minimum detection distance of the three-dimensional image sensor 111.

A field of view may be a predetermined value according to the type of three-dimensional image sensor 111. For example, a field of view of an A sensor may be 60 degrees, but a field of view of a B sensor may be 70 degrees. In addition, the minimum detection distance of the three-dimensional image sensor 111 may be a predetermined value. For example, the minimum detection distance may be set such that a bottom surface of a distance of minimum 100 mm can be identified for driving the robot cleaner 100.

Here, the arrangement height of the three-dimensional image sensor 111 and the arrangement angle of the three-dimensional image sensor 111 may be set based on the predetermined field of view of the three-dimensional image sensor 111 and the predetermined minimum detection distance of the three-dimensional image sensor 111. The arrangement height may include information regarding at which height of the entire height of the robot cleaner 100, that the three-dimensional image sensor 111 is arranged. The arrangement angle may describe a tilting angle by which the three-dimensional image sensor 111 is tilted toward a lower direction (a direction toward the bottom surface) based on the driving direction of the robot cleaner 100, but embodiments are not limited thereto.

The three-dimensional image sensor 111 may be implemented as a stereo vision type, a structured light type, and/or a time of flight (TOF) type. A sensor of a stereo vision type may be configured to perform a method of acquiring images in two coordinate systems, and finding a correspondence in the two images and calculating the distance. In addition, a structured light type may be configured to perform a method of projecting a pattern in a dot, line, and/or surface form, and calculating the distance. A TOF type may be configured to perform time delay measurement, and may be further configured to perform a method of calculating the distance by measuring time from the time point when a light wave is projected until the time point when the projected light wave is received again after being reflected. According to the type of the respective sensor, the field of view of the sensor may vary, and even in the case of sensors of the same type, their fields of view may be different according to the manufacturers.

According to an embodiment of the disclosure, in case a field of view, a minimum detection distance, and an arrangement angle are set, an optimal arrangement height may be calculated. For detailed calculation, Equation 1 (2410) in FIG. 24 may be used.

$$H_S = D_{min} * \tan(\theta_{pitch} + 0.5 * \theta_{FVOV})$$ Equation 1

According to another embodiment of the disclosure, in case a field of view, a minimum detection distance, and an arrangement height are set, an optimal arrangement angle may be calculated. For detailed calculation, Equation 2 (2415) in FIG. 24 may be used.

$$\theta_{pitch} = \tan^{-1}\left(\frac{Hs}{D_{min}}\right) - 0.5 * \theta_{VFOV}$$ Equation 2

The optical sensor 113 may be arranged to be lower than the location wherein the three-dimensional image sensor 111 is arranged. As the optical sensor 113 is a sensor that detects a light reflected from the bottom surface, it may be preferable that the optical sensor 113 is arranged in the lower part of the robot cleaner 100. However, the optical sensor 113 does not necessarily have to be arranged in the lower part of the robot cleaner 100, and the optical sensor 113 may be implemented in a form of being arranged in a relatively lower part than the three-dimensional image sensor 111. Detailed explanation in this regard will be made later with reference to FIG. 23.

The optical sensor 113 and the three-dimensional image sensor 111 may be arranged outside the housing of the robot cleaner 100. Detailed explanation in this regard will be made later with reference to FIG. 23 and FIG. 26.

The arrangement height information of the three-dimensional image sensor 111 may be between 35 mm and 85 mm, and the determined tilting angle may be between 0 degrees and 19 degrees. The range of the arrangement height and the range of the arrangement angle may be ranges determined in consideration of the predetermined minimum detection distance and the field of view of the three-dimensional image sensor 111. The most accurate data may be received from the aforementioned ranges. Detailed explanation in this regard will be made later with reference to FIG. 24.

The optical sensor 113 may be arranged to detect an area between a wheel or wheels (not shown) of the robot cleaner 100 and the minimum detection distance of the three-dimensional image sensor 111.

The three-dimensional image sensor 111 may detect an area between the wheel of the robot cleaner 100 and the minimum detection distance of the three-dimensional image sensor 111. The minimum detection distance may vary based on the tilting angle by which the three-dimensional image sensor 111 is arranged. Here, the three-dimensional image sensor 111 may not detect an area between the wheel of the robot cleaner 100 and the minimum detection distance of the three-dimensional image sensor 111. For detecting an area that cannot be detected by the three-dimensional image sensor 111, the robot cleaner 100 may use the optical sensor 113.

The optical sensor 113 may be arranged to detect an area between the wheel of the robot cleaner 100 and the minimum detection distance of the three-dimensional image sensor 111. In addition, the at least one processor 120 may control the optical sensor 113 arranged to detect an area between the wheel of the robot cleaner 100 and the minimum detection distance of the three-dimensional image sensor 111.

The aforementioned embodiment describes a case wherein an area detected by the three-dimensional image sensor 111 and an area detected by the optical sensor 113 are arranged such that they do not overlap with each other. For example, an area between the wheel of the robot cleaner 100 and the minimum detection distance of the three-dimensional image sensor 111 may be detected by the optical sensor 113, and an area between the minimum detection distance of the three-dimensional image sensor 111 and the maximum detection distance of the three-dimensional image sensor 111 may be detected by the three-dimensional image sensor 111. In an embodiment wherein the three-dimensional image sensor 111 and the optical sensor 113 are arranged such that detection areas do not overlap, the maximum detection distance of the three-dimensional image sensor 111 may become long, and thus more objects may be identified, and objects may be identified more quickly.

However, according to another embodiment of the disclosure, the robot cleaner 100 may be implemented such that an area detected by the three-dimensional image sensor 111 and an area detected by the optical sensor 113 partially overlap. For example, an area between the wheel of the robot cleaner 100 and a specific point (a distance bigger than the minimum detection distance of the three-dimensional image sensor 111) may be detected by the optical sensor 113, and an area between the minimum detection distance of the three-dimensional image sensor 111 and the maximum detection distance of the three-dimensional image sensor 111 may be detected by the three-dimensional image sensor 111. An area between the minimum detection distance of the three-dimensional image sensor 111 and a specific point may be detected by both of the three-dimensional image sensor 111 and the optical sensor 113. In an embodiment wherein detection areas of the three-dimensional image sensor 111 and the optical sensor 113 partially overlap, accuracy of object identification can be improved.

The at least one processor 120 may acquire spatial information based on image data acquired from the three-dimensional image sensor 111, control the driving state of the robot cleaner 100 based on the acquired spatial information, acquire a slope angle indicating the degree by which the robot cleaner 100 is tilted based on an X value and a Y value among an X value, a Y value, and a Z value acquired from the gyro sensor 112, and if the slope angle is greater than or equal to a threshold value, the at least one processor 120 may change the acquired spatial information based on the slope angle, and control the driving state of the robot cleaner 100 based on the changed spatial information.

The at least one processor 120 may acquire sensing data from at least one of the three-dimensional image sensor 111 or the gyro sensor 112.

The at least one processor 120 may acquire spatial information based on sensing data acquired from the three-dimensional image sensor 111, and control the driving state of the robot cleaner 100 based on the acquired spatial information.

The at least one processor 120 may acquire a slope angle indicating the degree by which the robot cleaner 100 is tilted based on sensing data acquired from the gyro sensor 112, and if the slope angle is greater than or equal to a threshold value, the at least one processor 120 may change the acquired spatial information based on the slope angle, and control the driving state of the robot cleaner 100 based on the changed spatial information.

Here, spatial information may describe two-dimensional spatial information or three-dimensional spatial information. In addition, spatial information may be information constituting a driving map necessary for a driving path of the robot cleaner 100. For example, spatial information may include information on geographical features and obstacles around the robot cleaner 100. In addition, spatial information may include information on the form of a space around the robot cleaner 100. The at least one processor 120 may set a driving path of the robot cleaner 100 based on spatial information, and the at least one processor 120 may control the driving state of the robot cleaner 100 based on spatial information.

Here, controlling the driving state may describe an operation of determining which path the robot cleaner 100 will run in which mode. Accordingly, an operation of controlling the driving state based on spatial information may describe that the driving mode or the driving path of the robot cleaner 100 is determined based on spatial information.

Here, the slope angle may comprise the degree by which the robot cleaner 100 is tilted. For example, if it is assumed that the robot cleaner 100 is running on the bottom of which tilt is 30 degrees, the at least one processor 120 may identify that the tilt of the robot cleaner 100 is 30 degrees based on sensing data acquired from the gyro sensor 112. The expression "the slope angle is greater than or equal to a threshold value" may be replaced by the expression "if the tilting value is greater than or equal to a threshold value."

Here, the threshold value may vary according to a user's setting. For example, if it is assumed that the threshold value is 20 degrees, in case the current tilting value of the robot cleaner 100 is 30 degrees based on the slope angle, the at least one processor 120 may change the acquired spatial information based on the slope angle.

Here, an operation of changing the acquired spatial information may describe changing detailed data for a space around the robot cleaner 100. Here, the detailed data may comprise the structure, the location, the model, etc. of a space. For example, it may be identified that a flat bottom exists in the front part of the robot cleaner 100 based on spatial information acquired from the three-dimensional image sensor 111. However, if a tilting value included in a slope angle is 30 degrees, the at least one processor 120 may change the spatial information and identify that the front part of the robot cleaner 100 is not a flat bottom but a tilted bottom. Then, it is assumed that the at least one processor 120 operates in a first mode on a flat bottom, and operates in a second mode on a tilted bottom. The at least one processor 120 may run in the second mode but not in the first mode based on the slope angle acquired from the gyro sensor 112. The at least one processor 120 may control the driving state such that the robot cleaner 100 operates in the second mode.

Spatial information may include at least one of front part information, left side wall information, right side wall information, ceiling information, or bottom information (or, bottom surface information). Here, individual information may be image information.

The at least one processor 120 may acquire bottom information based on distance information between the main body of the robot cleaner 100 and the bottom surface, and if the slope angle is greater than or equal to the threshold value, the at least one processor 120 may change the bottom information based on the acquired slope angle and front part information.

Here, the front part information may describe information on a space corresponding to the front part of the driving direction of the robot cleaner 100. For example, the front part information may be the shape and location information of the wall surface in the front part of the moving direction of the robot cleaner 100.

Here, the bottom information may describe information on a space corresponding to the lower part of the driving direction of the robot cleaner 100. For example, the bottom information may be the shape and material information of the bottom in the lower part of the moving direction of the robot cleaner 100. The at least one processor 120 may identify whether the bottom on which the robot cleaner 100 is going to run on is flat or bumpy based on the bottom information.

In addition, the bottom information may be acquired based on the distance information between the main body of the robot cleaner 100 and the bottom surface. For example, if it is identified that the distance between the main body and the bottom surface is regular during a driving time based on sensing data acquired from the three-dimensional image sensor 111, the at least one processor 120 may determine that the bottom is flat. In addition, in case the distance between the main body and the bottom surface is not regular during a driving time based on sensing data acquired from the three-dimensional image sensor 111, the at least one processor 120 may determine that the bottom is not flat.

In addition, if it is assumed that the current tilting value of the robot cleaner 100 is 30 degrees and the threshold value is 20 degrees and if it is identified that the tilting value (30 degrees) is greater than or equal to the threshold value (20 degrees), the at least one processor 120 may identify that the tilt of the bottom is 30 degrees based on the slope angle (the tilting value of 30 degrees) and the front part information (a wall or an obstacle exists 1 m ahead). If there was no slope angle, the at least one processor 120 may have determined that the bottom is flat, and the at least one processor 120 may determine that there is a tilt on the bottom based on the slope angle.

There may be a limitation on determining a space accurately with only sensing data acquired from the three-dimensional image sensor 111. In the aforementioned embodiment, if there was no slope angle, the at least one processor 120 may have determined that a wall or an obstacle exists in the front part. However, as the slope angle (the tilting value of 30 degrees) was considered together, the at least one processor 120 may identify that a wall or an obstacle does not exist in the front part, but that there is a bottom having a tilt. Accordingly, if sensing data acquired from the gyro sensor 112 and sensing data acquired from the three-dimensional image sensor 111 are used together, the at least one processor 120 may generate a driving map having high accuracy.

A detailed embodiment related to controlling a drive state based on a slope angle will be described later with reference to FIG. 3.

If the time that a slope angle is maintained to be greater than or equal to the threshold value is greater than or equal to a threshold time, the at least one processor 120 may change spatial information based on the acquired slope angle and control the driving state of the robot cleaner 100 based on the changed spatial information, and if the time that a slope angle is maintained to be greater than or equal to the threshold value is less than the threshold time, the at least one processor 120 may control the driving state of the robot cleaner 100 based on the slope angle.

If it is identified that the slope angle (e.g., the tilting value of 30 degrees) is greater than or equal to the threshold value (e.g., 20 degrees) during 12 seconds which is greater than or equal to the threshold time (e.g., five seconds), the at least one processor 120 may change the spatial information based on the acquired slope angle (e.g., 30 degrees). Here, changing spatial information may describe identifying that the bottom is not a flat bottom but a bottom of which tilt is 30 degrees.

If it is identified that the slope angle (e.g., the tilting value of 30 degrees) is greater than or equal to the threshold value (e.g., 20 degrees) during one second which is less than the threshold time (e.g., five seconds), the at least one processor 120 may control the driving state by using only the slope angle (e.g., 30 degrees). In case the tilting value is higher than the threshold value but the time is short, the at least one processor 120 may identify that an obstacle exists on the driving path of the robot cleaner 100. Accordingly, the at least one processor 120 may not perform an operation of changing the spatial information, and control the driving state by using only the slope angle. Here, the operation of controlling the driving state by using only the slope angle may include at least one of an operation of running over an obstacle, an operation of avoiding an obstacle, and/or an operation of warning about an obstacle. In addition, an operation of warning about an obstacle may comprise outputting audio data through a speaker, and/or outputting a warning image through a display.

An embodiment wherein a driving state is controlled differently based on a threshold time will be described in detail later with reference to FIG. 5.

If it is identified that a fall risk area exists based on the acquired spatial information, the at least one processor 120 may identify a fall possibility based on sensing data acquired from the optical sensor 113, and control the driving state of the robot cleaner 100 based on the fall possibility.

In addition, the at least one processor 120 may identify whether runover driving is necessary based on the acquired slope angle, and if it is identified that runover driving is necessary, the at least one processor 120 may identify whether a fall risk area exists based on the acquired spatial information, and control the driving state of the robot cleaner 100 based on whether a fall risk area exists.

The at least one processor 120 may identify whether runover driving is necessary based on a slope angle. Specifically, in case a tilting value is greater than or equal to the threshold value (e.g., 40 degrees), the at least one processor 120 may determine that the robot cleaner 100 is in contact with an obstacle, and control the driving state such that the robot cleaner 100 runs over the obstacle. If a tilting value is the threshold value (e.g., 60 degrees), the at least one processor 120 may control the robot cleaner 100 such that it performs avoidance driving instead of runover driving.

Here, the at least one processor 120 may identify whether runover driving is necessary in consideration of information on both a slope angle and time of change of a tilting value. For example, a case wherein a tilting value changes from 0 degrees to 40 degrees is assumed. Here, the at least one processor 120 may identify the time that takes until the tilting value changes from 0 degrees to 40 degrees (hereinafter, referred to as the time of change). If the time of change is greater than or equal to the threshold time (e.g., five seconds), the at least one processor 120 may determine that the tilt of the bottom changed, and if the time of change is less than the threshold time (e.g., five seconds), the at least one processor 120 may determine that the robot cleaner 120 is in contact with an obstacle.

Here, a fall area may describe an area wherein the bottom is not continued smoothly, but the depth of the bottom varies drastically. For example, a fall area may comprise an area wherein the robot cleaner 100 may fall and get damaged. In addition, a fall risk area may comprise an area which is supposed to be a fall area based on spatial information.

In case a fall area is determined based on sensing data acquired from the three-dimensional image sensor 111, accuracy may deteriorate. Accordingly, the at least one processor 120 may additionally use sensing data acquired from the optical sensor 113.

Here, the robot cleaner 100 may include the optical sensor 113.

If it is identified that a fall risk area exists based on the acquired spatial information, the at least one processor 120 may identify a fall possibility based on sensing data acquired from the optical sensor 113, and control the driving state of the robot cleaner 100 based on the fall possibility.

Here, the optical sensor 113 may be a sensor detecting light, and the robot cleaner 100 may acquire brightness information based on sensing data acquired from the optical sensor 113. For example, the optical sensor 113 may comprise at least one of an illumination sensor, an infrared sensor, an ultraviolet sensor, or a visible light sensor. Here, an infrared sensor may comprise a light-emitting part and a light-receiving part, and it may acquire sensing data by using a camera that can receive infrared rays reflected after emitting infrared rays, such as to the front side of the device.

The at least one processor 120 may acquire brightness information based on sensing data acquired from the optical sensor 113. Here, the brightness information may describe reflectance for a light (or a laser).

Then, the at least one processor 120 may identify a fall possibility based on the brightness information. In case the fall possibility is high, the at least one processor 120 may stop driving the robot cleaner 100 and control the driving state such that the robot cleaner 100 avoids the fall risk area.

An operation of determining a fall possibility according to brightness information will be described in detail later with reference to FIG. 9.

In case a bottom characteristic is not identified based on sensing data acquired from the optical sensor 113, an object located on the bottom may be identified based on the acquired spatial information, and if an object is identified, the height of the object may be identified, and a bottom characteristic may be identified based on the identified height of the object.

The at least one processor 120 may acquire brightness information based on sensing data acquired from the optical sensor 113, and identify bottom characteristic information based on the brightness information. Here, the bottom characteristic information may comprise at least one of a shape, a material, or a color (shade) of the bottom on which the robot cleaner 100 is running. For example, the at least one processor 120 may identify whether the bottom is a soft area or a hard area based on the brightness information. Detailed explanation will be made with reference to FIG. 6 to FIG. 13.

In case a bottom characteristic is not identified based on sensing data acquired from the optical sensor 113, the at least one processor 120 may identify an object located on the bottom based on the acquired spatial information, and if an object is identified, the height of the object may be identified, and a bottom characteristic may be identified based on the identified height of the object.

Here, in case the acquired brightness is within a threshold range, the at least one processor 120 may not clearly identify a bottom characteristic. A case wherein a bottom characteristic is not identified may describe a case wherein it cannot be clearly identified whether the bottom characteristic is a soft area or a hard area.

Here, a case wherein a bottom characteristic is not identified may describe a case wherein a new bottom was identified during driving of the robot cleaner 100, but a characteristic for the new bottom cannot be identified. For example, if it is assumed that the characteristic of a first bottom on which the robot cleaner 100 is running is a hard area, the robot cleaner 100 may identify a new second bottom during driving. However, in case the brightness information is within the threshold range, the at least one processor 120 may not identify the characteristic of the second bottom.

Here, an object located on the bottom may comprise a new object which is different from the bottom on which the robot cleaner 100 is running. For example, if a situation is assumed wherein a carpet is placed in the front part of the robot cleaner 100 that is running on marble, the marble may be the bottom on which the robot cleaner 100 is running (or the first bottom), and the carpet may be an object located on the bottom (or the second bottom).

In addition, an object located on the bottom may comprise a new bottom of which height information is different from that of the previous bottom.

From the stance of the robot cleaner 100, another bottom may also be identified as a new object, and thus identification of the height of an object by the at least one processor 120 may describe acquisition of the height information of a new bottom (e.g., a carpet placed on marble).

Detailed explanation related to identifying a bottom characteristic by acquiring height information will be described later with reference to FIG. 10.

In general, a bottom including a hard area may have a heavy weight, and thus the height of the bottom may be low, and a bottom including a soft area may have a light weight, and thus the height of the bottom may be high.

Accordingly, if the height of an object located on the bottom (a new bottom) is greater than or equal to the threshold value, the at least one processor 120 may identify that the object located on the bottom (the new bottom) is a soft area. In addition, if the height of an object located on the bottom (a new bottom) is smaller than the threshold value, the at least one processor 120 may identify that the object located on the bottom (the new bottom) is a hard area.

However, such a setting is not absolute, and it may be changed by a user's setting. According to another embodiment of the disclosure, if the height of an object located on the bottom (a new bottom) is greater than or equal to the threshold value, the at least one processor 120 may identify that the object located on the bottom (the new bottom) is a hard area.

In addition, the threshold value may be changed according to a user's setting.

The at least one processor 120 may identify an object located on a driving path of the robot cleaner 100 based on the acquired spatial information, and if the identified object is a prestored subject to be avoided, the at least one processor 120 may control the driving state of the robot cleaner 100 such that the robot cleaner 100 avoids the object, and if the identified object is not a prestored subject to be avoided, the at least one processor 120 may control the driving state of the robot cleaner 100 such that the robot cleaner 100 runs over the object.

Here, an object located on a driving path may comprise an obstacle. The at least one processor 120 may identify an object located on a driving path of the robot cleaner 100 through the three-dimensional image sensor 111. Then, the at least one processor 120 may acquire the type of the identified object. If the acquired type of the object is a prestored subject to be avoided, the at least one processor 120 may control the driving state of the robot cleaner 100 such that the robot cleaner 100 runs while avoiding the object.

For example, an object which is a subject to be avoided may be a cable, a Lego, a towel, etc., and an object which is a subject to be run over may be a carpet, a door sill, a rug, etc.

Detailed operations related to runover and avoidance will be described later with reference to FIG. 18.

The three-dimensional image sensor 111 may be arranged to be tilted by a threshold angle in the direction of the bottom for acquiring data for the front part and the lower part of the robot cleaner 100, and the threshold angle may be determined based on at least one of the distance information from the main body to the target bottom surface or the height information of the three-dimensional image sensor 111.

Here, the threshold angle may describe the arrangement angle of the three-dimensional image sensor 111, and it may be information indicating how much the three-dimensional image sensor 111 is tilted in a lower direction based on the driving direction of the robot cleaner 100.

Here, the threshold angle may be changed by a user's setting, and it may vary according to the type of the robot cleaner 100. For acquiring data effectively and generating a driving map having high accuracy, the threshold angle may be determined based on at least one of the distance information from the main body to the target bottom surface or the height information of the three-dimensional image sensor 111.

Here, the target bottom surface may describe a bottom surface which is distanced from the main body as much as the minimum detection distance to the bottom surface that is necessary for generating an effective driving map. In addition, the height information of the three-dimensional image sensor 110 may describe height information based on the lowermost component (e.g., the lower end part of the wheel) of the robot cleaner 100. In general, if it is assumed that the minimum detection distance is the same, the higher the height of the three-dimensional image sensor 111 is, the greater the threshold angle may become. Here, the feature that the threshold angle becomes greater may describe that the arrangement direction of the three-dimensional image sensor 111 is tilted more toward the bottom surface.

Detailed explanation regarding the threshold angle of the three-dimensional image sensor 111 based on distance information or height information will be made later with reference to FIG. 15 and FIG. 16.

Here, if the height of the main body changes during driving of the robot cleaner 100, the at least one processor 120 may change the threshold angle of the three-dimensional image sensor 111.

In a driving process of the robot cleaner 100, there may be a special case wherein the height of the main body of the robot cleaner 100 becomes higher. For example, a special case may be a process of running over a specific object or a case wherein the bottom surface is not flat. In such a situation, the height of the main body may change. If the height of the main body changes, the height of the three-dimensional image sensor 111 may also change together. Accordingly, as the height of the main body changes, the at least one processor 120 may identify that the height of the three-dimensional image sensor 111 also changes, and as the height of the main body changes, the at least one processor 120 may change the threshold angle of the three-dimensional image sensor 111.

The reason for changing the threshold angle is as follows. As the height of the three-dimensional image sensor 111 changes, the minimum distance of the bottom that can be detected changes, and thus the threshold angle of the three-dimensional image sensor 111 may be changed to an optimal angle for generating a driving map having high accuracy. Here, an optimal angle may vary according to the height information of the three-dimensional image sensor 111. In general, as the height of the three-dimensional image sensor 111 is higher, the threshold angle may become greater. Here, the feature that the threshold angle becomes greater may describe that the arrangement direction of the three-dimensional image sensor 111 is tilted more toward the bottom surface.

The threshold angle may be determined based on distance information from the main body to the target bottom surface, and the height information and the slope angle of the three-dimensional image sensor 111.

In a driving process, there may be a case wherein the robot cleaner 100 runs on a bottom surface having a tilt. For example, if it is assumed that a first bottom having no tilt and a second bottom having a tilt exist on a driving path, on the time point of going from the first bottom to the second bottom, the distance information of the bottom surface that the robot cleaner 100 can detect may become different. Here, the at least one processor 120 may change the threshold angle of the three-dimensional image sensor 111 based on the slope angle. In general, for identifying a minimum detection distance, the at least one processor 120 may reduce the threshold angle of the three-dimensional image sensor 111 on a time point of running from a bottom having no tilt to a bottom having a tilt.

Detailed explanation regarding adjusting a threshold angle according to whether there is a tilt will be made later with reference to FIG. 16.

The robot cleaner 100 according to an embodiment of the disclosure subsidiarily uses sensing data acquired from other sensors at the same time as using sensing data acquired from the three-dimensional image sensor 111, and thus a driving map having high accuracy can be generated. Accordingly, the robot cleaner 100 can effectively respond to a risk area or an obstacle, etc. in a blind spot.

In the above description, only simple components constituting the robot cleaner 100 were illustrated and described, but in actual implementation, various components may additionally be included. Explanation in this regard will be made below with reference to FIG. 2.

Figure 2:
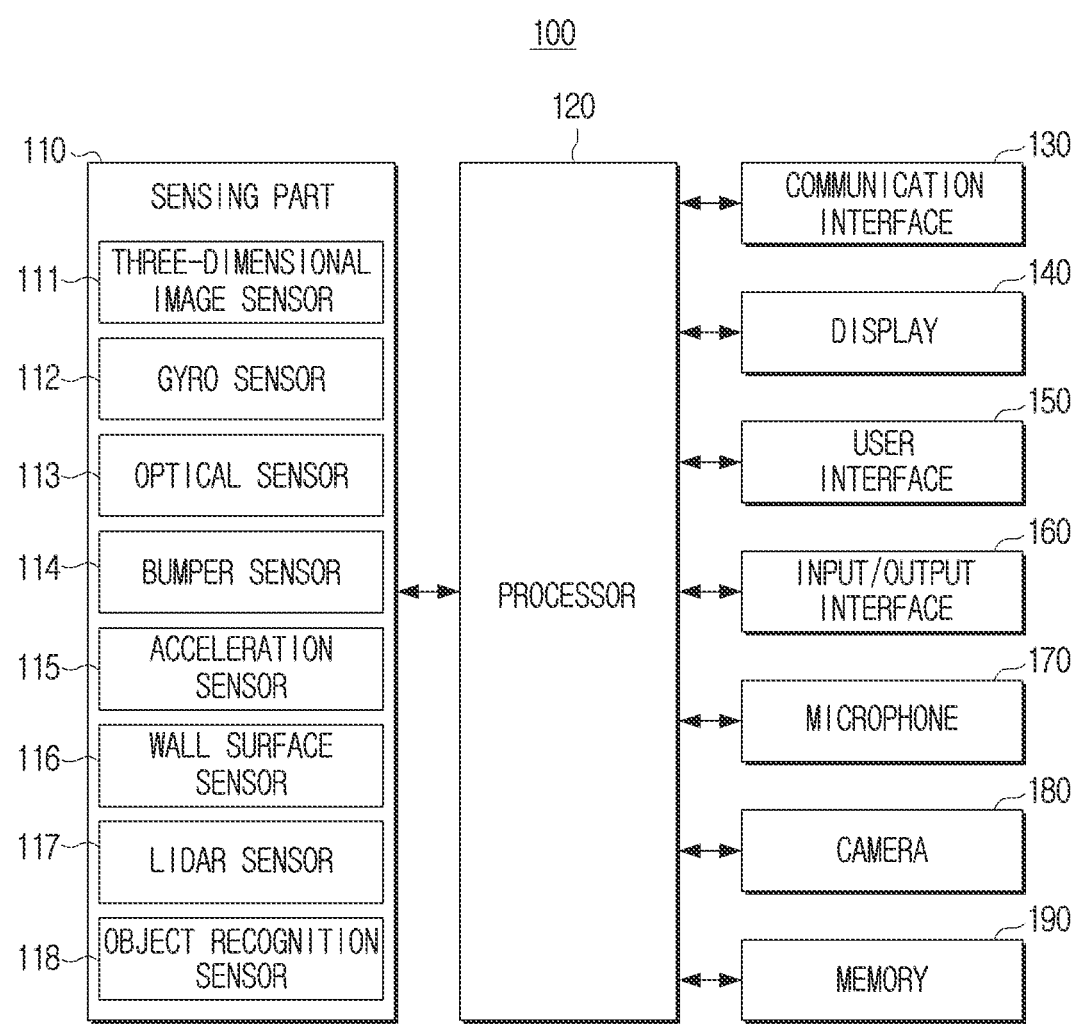
FIG. 2 is a block diagram for illustrating a detailed configuration of the robot cleaner in FIG. 1 according to an embodiment of the disclosure.

FIG. 2 is a block diagram for illustrating a detailed configuration of the robot cleaner in FIG. 1 according to an embodiment of the disclosure.

Referring to FIG. 2, the robot cleaner 100 may comprise a sensing part 110, the at least one processor 120, a communication interface 130, a display 140, a user interface 150, an input/output interface 160, a microphone 170, a camera 180, and a memory 190.

Here, the sensing part 110 may include at least one of the three-dimensional image sensor 111, the gyro sensor 112, the optical sensor 113, a bumper sensor 114, an acceleration sensor 115, a wall surface sensor 116, a two-dimensional image (e.g., Light Detection and Ranging (LIDAR)) sensor 117, and/or an object recognition sensor 118.

Among the operations of the three-dimensional image sensor 111, the gyro sensor 112, the optical sensor 113, and the at least one processor 120, regarding operations that are the same as the operations described above, overlapping explanation will be omitted.

The bumper sensor 114 may comprise a contact sensor attached to the main body of the robot cleaner 100. The bumper sensor 114 may acquire sensing data regarding whether there is a physical contact for detecting an obstacle or a wall. In addition, the bumper sensor 114 may be arranged in the outer part of the main body, and perform a function of alleviating shock when the robot cleaner 100 collides with an obstacle during driving. In addition, the bumper sensor 114 may perform a role of an auxiliary sensor as an obstacle sensor. For example, an obstacle, etc. that the three-dimensional image sensor 111 could not recognize may be recognized by the bumper sensor 114. The bumper sensor 114 may be configured to use a method wherein a switch is clicked by a physical force when an object contacts the bumper sensor 114.

The acceleration sensor 115 may be a sensor that detects a moving state of the robot cleaner 100 and acquires data regarding change of movement speed. The acceleration sensor 115 may acquire a motion vector through detection of the moving distance and the moving direction of the robot cleaner 100.

The wall surface sensor 116 may comprise a sensor that detects data for a wall and acquires sensing data so that the robot cleaner 100 can run following the wall. The robot cleaner 100 may perform a cleaning operation while moving along a wall based on data acquired from the wall surface sensor 116.

The LIDAR sensor 117 may be a sensor that acquires distance information or location information with an object by irradiating a laser. LIDAR may comprise a technology of using a laser light, and using time from a time point when a laser light is emitted to a time point when the laser light is received after being reflected on an object, and detecting a change in a wavelength. By using sensing data acquired from the LIDAR sensor 117, the speed of an object, the direction of an object, and/or the shape of a surrounding space can be acquired.

The object recognition sensor 118 may comprise a sensor that recognizes an object that exists on or along a driving path of the robot cleaner 100. For recognizing an object, the object recognition sensor 118 may recognize an object by acquiring sensing data from at least one of the three-dimensional image sensor 111, the bumper sensor 114, or the two-dimensional image sensor 117. As the object recognition sensor 118 uses sensing data of other sensors, the object recognition sensor 118 may be described as an object recognition module.

In addition, the sensing part 110 may include a line laser sensor (not shown). The line laser sensor may use a principle where a two-dimensional laser physically changes when it is irradiated on an obstacle by emitting a line laser vertically and using a scanned image.

The sensing part 110 may optimize sensing data acquired from various types of sensors. In addition, optimized sensing data may be used in generating a driving map of the robot cleaner 100. Specifically, as sensing data acquired from various types of sensors includes a large amount of data, the at least one processor 120 may perform a data compression and conversion operation. In addition, the at least one processor 120 may convert received sensing data into data related to the upper part, an obstacle, and determination of runover/avoidance that are necessary for detection of an obstacle.

The communication interface 130 is a component that performs communication with various types of external devices according to various types of communication methods. The communication interface 130 includes a transceiver, Wi-Fi module, a Bluetooth module, an infrared communication module, and/or a wireless communication module, etc. Here, each communication module may be implemented in the form of at least one hardware chip.

The Wi-Fi module and the Bluetooth module perform communication by using a Wi-Fi method and a Bluetooth method, respectively. In the case of using a Wi-Fi module or a Bluetooth module, various types of connection information such as an SSID and a session key is transmitted and received first, and connection of communication is performed by using the information, and various types of information can be transmitted and received thereafter.

The infrared communication module performs communication according to an Infrared Data Association (IrDA) technology of transmitting data to a near field wirelessly by using infrared rays between visible rays and millimeter waves.

The wireless communication module may include at least one communication chip that performs communication according to various wireless communication protocols such as Zigbee, 3rd generation (3G), 3rd generation partnership project (3GPP), Long Term Evolution (LTE), LTE Advanced (LTE-A), 4th Generation (4G), 5th Generation (5G), and those other than the aforementioned communication methods.

The communication interface 130 may include at least one of a local area network (LAN) module, an Ethernet module, a pair cable, a coaxial cable, an optical fiber cable, and/or a wired communication module that performs communication by using an ultra wide-band (UWB) module, etc.

According to an embodiment of the disclosure, the communication interface 130 may use the same communication module (e.g., a Wi-Fi module) for communicating with an external device like a remote control and an external server.

According to another embodiment of the disclosure, the communication interface 130 may use different communication modules (e.g., a Wi-Fi module) for communicating with an external device like a remote control and an external server. For example, the communication interface 130 may use at least one of an Ethernet module or a Wi-Fi module for communicating with an external server, and use a BT module for communicating with an external device like a remote control. However, this is merely an example, and the communication interface 130 may use at least one communication module among various communication modules in the case of communicating with a plurality of external devices or external servers.

The display 140 may be implemented as displays in various forms such as a liquid crystal display (LCD), an organic light emitting diodes (OLED) display, a plasma display panel (PDP), etc. In the display 140, driving circuits that may be implemented in forms such as an a-si TFT, a low temperature poly silicon (LTPS) TFT, an organic TFT (OTFT), a backlight unit, etc. may also be included together. The display 140 may also be implemented as a touch screen combined with a touch sensor, a flexible display, a 3D display, etc.

In addition, the display 140 according to an embodiment of the disclosure may include not only a display panel outputting images, but also a bezel housing the display panel. In particular, the bezel according to an embodiment of the disclosure may include a touch sensor (not shown) for detecting user interactions.

The user interface 150 may be implemented as a device like a button, a touch pad, a mouse, and a keyboard, or as a touch screen that can perform both of the aforementioned display function and a manipulation input function. Here, a button may be various types of buttons such as a mechanical button, a touch pad, a wheel, etc. formed in any areas such as the front surface part, the side surface part, the rear surface part, etc. of the exterior of the main body of the robot cleaner 100.

The input/output interface 160 may transmit a command or data input from an external device to the robot cleaner 100, or transmit a control command or data received at the robot cleaner 100 to an external device.

The robot cleaner 100 may further include the microphone 170. The microphone is a component for receiving input of a user voice or other voices and converting them into audio data.

The microphone 170 may receive a user voice in an activated state. For example, the microphone may be formed as a type integrated with the upper side or the front surface direction, the side surface direction, etc. of the robot cleaner 100. The microphone may include various components such as a microphone collecting a user voice in an analogue form, an amp circuit amplifying the collected user voice, an A/D conversion circuit that samples the amplified user voice and converts the user voice into a digital signal, a filter circuit that removes noise components from the converted digital signal, etc.

The camera 180 is a component for photographing a subject and generating a photographed image, and here, a photographed image is a concept including both a moving image and a still image.

The camera 180 may acquire an image for at least one external device, and it may be implemented as a camera, a lens, an infrared sensor, etc.

The camera 180 may include a lens and an image sensor. As types of a lens, there are general all-purpose lens, wide angle lens, zoom lens, etc., and the types implemented may be determined according to the type, the characteristic, the use environment, etc. of the robot cleaner 100. As an image sensor, a complementary metal oxide semiconductor (CMOS) and a charge coupled device (CCD), etc. may be used.

The camera 180 outputs incident lights as an image signal. Specifically, the camera 180 may include a lens, pixels, and an AD converter. The lens may gather lights of a subject and make an optical image formed on a photographing area, and the pixels may output lights introduced through the lens as an image signal in an analog form. Then, the AD converter may convert the image signal in an analog form into an image signal in a digital form and output the image signal. In particular, the camera 180 is arranged to photograph the front surface direction of the robot cleaner 100, and the camera 180 may photograph a user existing on the front surface of the robot cleaner 100 and generate a photographed image.

In describing the robot cleaner 100 according to an embodiment of the disclosure, it is described that there is one camera 180, but in actual implementation, a plurality of photographing parts may be arranged. The robot cleaner 100 may include a plurality of photographing parts.

The memory 190 may be implemented as an internal memory such as a ROM (e.g., an electrically erasable programmable read-only memory (EEPROM)), a RAM, etc.

included in the at least one processor 120, or as a separate memory from the at least one processor 120. In this case, the memory 190 may be implemented in the form of a memory embedded in the robot cleaner 100, or in the form of a memory that can be attached to or detached from the robot cleaner 100 according to the use of stored data. For example, in the case of data for operating the robot cleaner 100, the data may be stored in a memory embedded in the robot cleaner 100, and in the case of data for an extension function of the robot cleaner 100, the data may be stored in a memory that can be attached to or detached from the robot cleaner 100.

In the case of a memory embedded in the robot cleaner 100, the memory may be implemented as at least one of a volatile memory (e.g., a dynamic RAM (DRAM), a static RAM (SRAM), or a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash, etc.), a hard drive, or a solid state drive (SSD)). In the case of a memory that can be attached to or detached from the robot cleaner 100, the memory may be implemented in forms such as a memory card (e.g., compact flash (CF), secure digital (SD), micro-secure digital (Micro-SD), mini-secure digital (Mini-SD), extreme digital (xD), a multimedia card (MMC), etc.), an external memory that can be connected to a USB port (e.g., a USB memory), etc.

Figure 3:
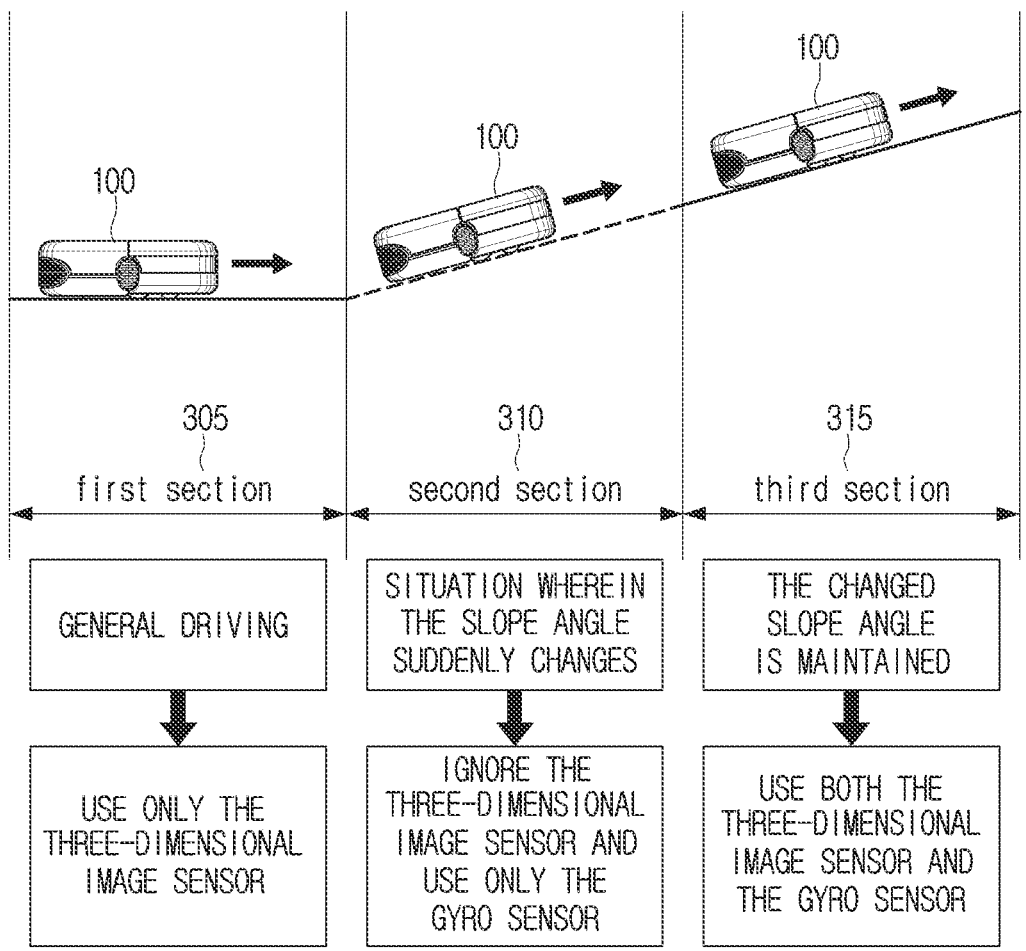
FIG. 3 is a diagram for illustrating an operation of controlling a driving state according to a situation of a robot cleaner according to an embodiment of the disclosure.

FIG. 3 is a diagram for illustrating an operation of controlling a driving state according to a situation of a robot cleaner according to an embodiment of the disclosure.

Referring to FIG. 3, it is assumed that the driving path of the robot cleaner 100 includes a first section 305, a second section 310, and a third section 315.

The first section 305 may be a flat bottom having no tilt. Here, the robot cleaner 100 may run in a general driving mode. The robot cleaner 100 may control the driving state by using only the three-dimensional image sensor 111 in the general driving mode.

The second section 310 may be a bottom that drastically changes from the flat bottom to a bottom having a tilt. When the robot cleaner 100 identifies the situation that the tilt drastically changes (or identifies the second section 310), the robot cleaner 100 may not use sensing data acquired from the three-dimensional image sensor 111, but control the driving state by using only sensing data acquired from the gyro sensor 112.

The third section 315 may be a bottom wherein the bottom having a tilt is maintained. While the third section 315 has a tilt in the same way as the second section 310, the second section 310 is a section wherein the flat bottom having no tilt just started to change to the bottom having a tilt, and the third section 315 may be a tilted bottom after the tilt was maintained for greater than or equal to a threshold distance. If the slope angle is greater than or equal to a threshold value for greater than or equal to a threshold time (or the third section 315 is identified), the robot cleaner 100 may control the driving state by using both of the three-dimensional image sensor 111 and the gyro sensor 112.

Figure 4:
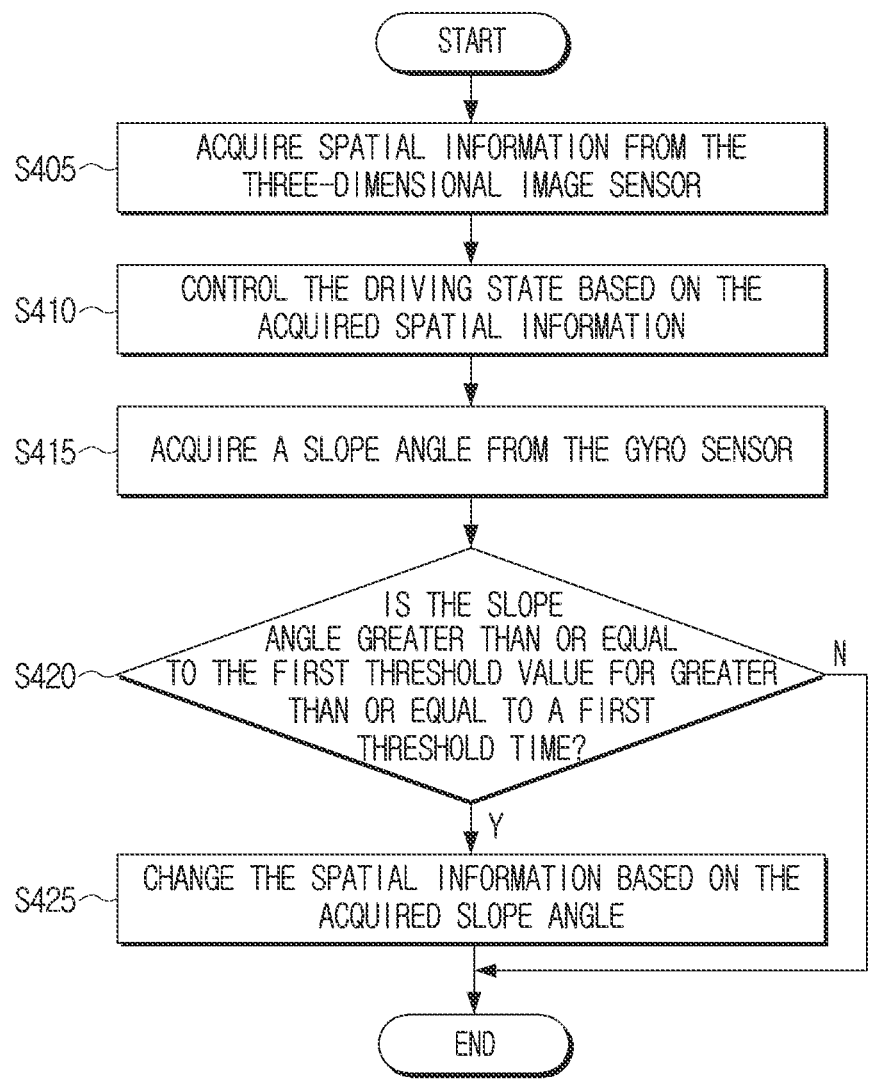
FIG. 4 is a flowchart for illustrating a controlling method of a robot cleaner according to an embodiment of the disclosure.

FIG. 4 is a flowchart for illustrating a controlling method of a robot cleaner according to an embodiment of the disclosure.

Referring to FIG. 4, the robot cleaner 100 may acquire spatial information from the three-dimensional image sensor 111 in operation S405. Specifically, the robot cleaner 100 may acquire sensing data from the three-dimensional image sensor 111, and analyze the acquired sensing data and acquire spatial information. In addition, the robot cleaner 100 may control the driving state of the robot cleaner 100 based on the acquired spatial information in operation S410.

Then, the robot cleaner 100 may acquire a slope angle from the gyro sensor 112 in operation S415. Then, the robot cleaner 100 may determine whether the slope angle (the slope angle acquired by operation S415) is greater than or equal to a first threshold value for greater than or equal to a first threshold time in operation S420. Here, in case the slope angle is greater than or equal to the first threshold value for greater than or equal to the first threshold time, the robot cleaner 100 may change the spatial information based on the acquired slope angle in operation S425. Then, the robot cleaner 100 may control the driving state based on the spatial information changed in operation S425.

In case the slope angle is smaller than the first threshold value for greater than or equal to the first threshold time, the robot cleaner 100 may control the driving state based on the spatial information acquired in operation S405.

In this case, the first threshold time and the first threshold value may be changed by a user's setting.

Figure 5:
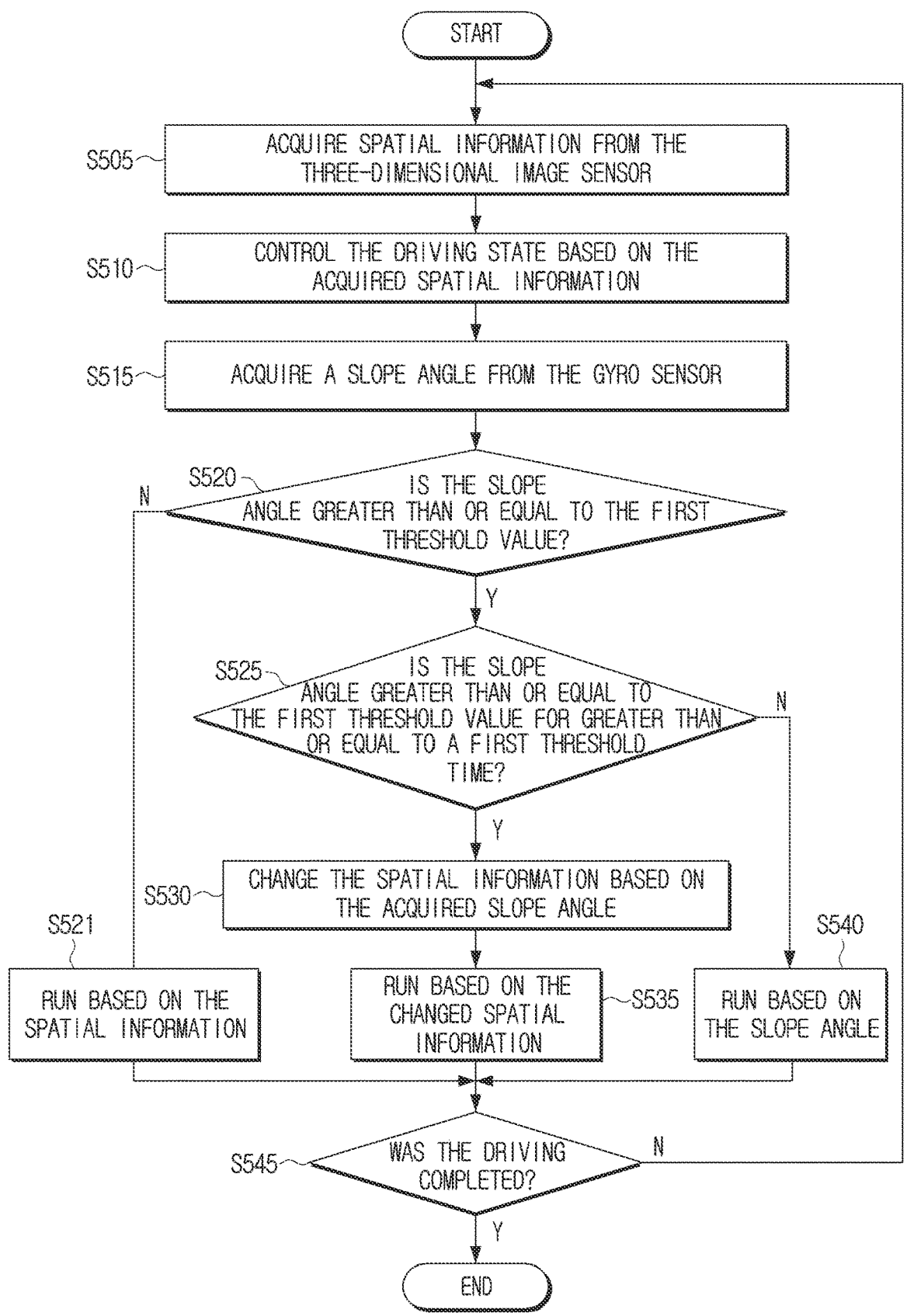
FIG. 5 is another flowchart for illustrating a controlling method of a robot cleaner according to an embodiment of the disclosure.

FIG. 5 is another flowchart for illustrating a controlling method of a robot cleaner according to an embodiment of the disclosure.

Referring to FIG. 5, the robot cleaner 100 may acquire spatial information from the three-dimensional image sensor 111 in operation S505. Then, the robot cleaner 100 may control the driving state based on the acquired spatial information in operation S510. Then, the robot cleaner 100 may acquire a slope angle from the gyro sensor 112 in operation S515.

The robot cleaner 100 may identify whether the slope angle acquired in operation S515 is greater than or equal to the first threshold value in operation S520. Here, if the slope angle is smaller than the first threshold value, the robot cleaner 100 may control the driving state based on the spatial information acquired in operation S505 in operation S521.

If the slope angle is greater than or equal to the first threshold value, the robot cleaner 100 may identify whether the slope angle (the slope angle acquired in operation S515) is greater than or equal to the first threshold value for greater than or equal to the first threshold time in operation S525. Here, if the slope angle is greater than or equal to the first threshold value for greater than or equal to the first threshold time, the robot cleaner 100 may change the spatial information based on the acquired slope angle in operation S530. Then, the robot cleaner 100 may control the driving state based on the spatial information changed by operation S530 in operation S535. If the slope angle is smaller than the first threshold value for greater than or equal to the first threshold time, the robot cleaner 100 may control the driving state based on the slope angle acquired by operation S515 in operation S540.

The robot cleaner 100 may determine whether the driving was completed after operation S535 and operation S540 in operation S545. Here, in case the driving was completed, the robot cleaner 100 may not acquire sensing data from the three-dimensional image sensor 111 and the gyro sensor 112 anymore. In case the driving was not completed, the robot cleaner 100 may acquire sensing data from the three-dimensional image sensor 111 and the gyro sensor 112 again. That is, in case the driving was not completed, the robot cleaner 100 may repeatedly perform operations S505, S510, and S515.

Figure 6:
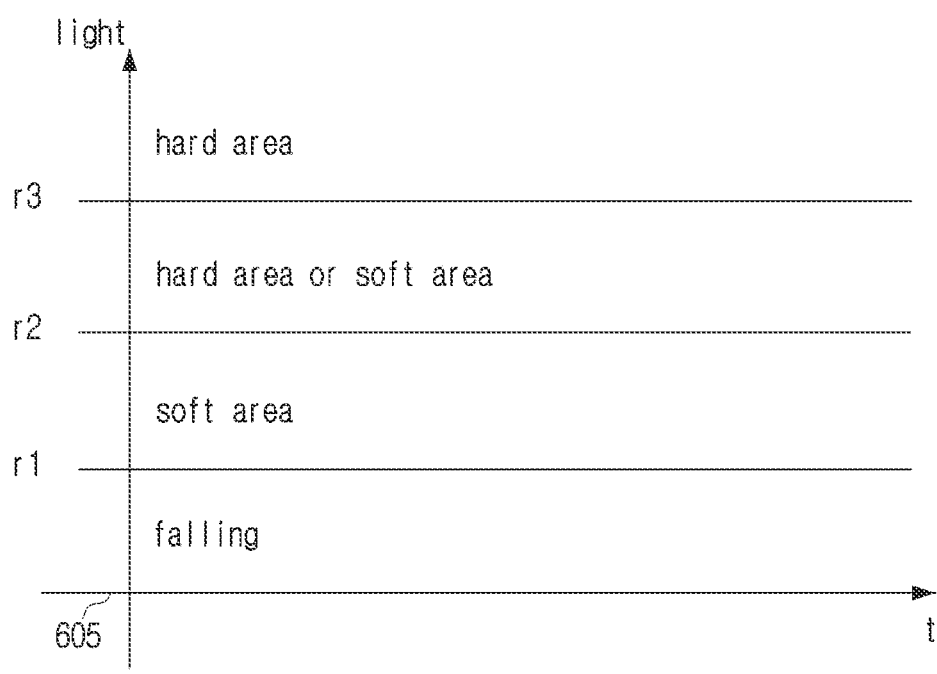
FIG. 6 is a table for illustrating an embodiment of controlling a driving state of a robot cleaner by using an optical sensor according to an embodiment of the disclosure.

FIG. 6 is a table for illustrating an embodiment of controlling a driving state of a robot cleaner by using an optical sensor according to an embodiment of the disclosure.

Referring to FIG. 6, the robot cleaner 100 may acquire sensing data from the optical sensor 113. Here, the sensing data acquired from the optical sensor 113 may be brightness information. The brightness information may comprise at least one of the strength of a light for a natural light or the reflectance of a light emitted from the optical sensor. Depending on cases, the brightness information may comprise at least one of the intensity of illumination, the intensity of a light, the speed of a light, or the luminance.

Referring to FIG. 6, a table 605 may be acquired in a process of analyzing sensing data acquired from the optical sensor 113. The x axis of the table 605 may be the time, and the Y axis may be the brightness. In case the brightness information acquired from the optical sensor 113 is smaller than a first threshold value r1, the robot cleaner 100 may determine that the robot cleaner 100 is in a fall risk state. If the brightness information acquired from the optical sensor 113 is greater than or equal to the first threshold value r1 and smaller than a second threshold value r2, the robot cleaner 100 may identify that the bottom on the driving path of the robot cleaner 100 is a soft area. If the brightness information acquired from the optical sensor 113 is greater than or equal to the second threshold value r2 and smaller than a third threshold value r3, the robot cleaner 100 may delay determination on whether the bottom on the driving path is a soft area or a hard area. If the brightness information acquired from the optical sensor 113 is greater than or equal to the third threshold value r3, the robot cleaner 100 may identify that the bottom on the driving path is a hard area. In a hard area, reflectivity of a light is high, and thus brightness information having a high value may be acquired from the optical sensor 113.

Figure 7:
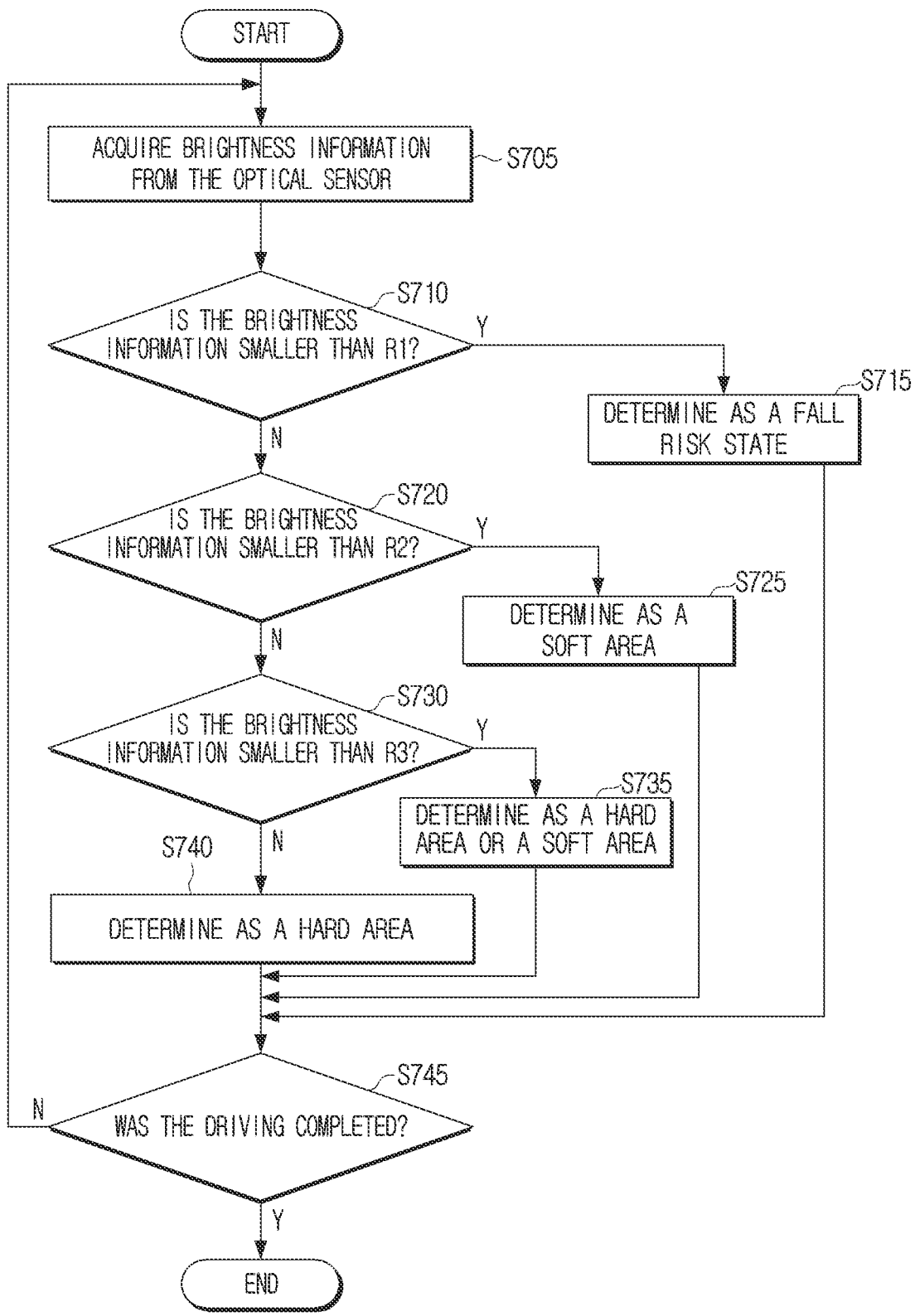
FIG. 7 is a flowchart for illustrating an embodiment of controlling a driving state of a robot cleaner by using an optical sensor according to an embodiment of the disclosure.

FIG. 7 is a flowchart for illustrating an embodiment of controlling a driving state of a robot cleaner by using an optical sensor according to an embodiment of the disclosure.

Referring to FIG. 7, the robot cleaner 100 may acquire brightness information from the optical sensor 113 in operation S705. Here, the robot cleaner 100 may determine whether the acquired brightness information is smaller than the first threshold value r1 in operation S710. If the brightness information is smaller than the first threshold value r1, the robot cleaner 100 may identify that the robot cleaner 100 is in a fall risk state in operation S715.

If the brightness information is greater than or equal to the first threshold value r1, the robot cleaner 100 may determine whether the brightness information is smaller than the second threshold value r2 in operation S720. If the brightness information is smaller than the second threshold value r2, the robot cleaner 100 may determine that the bottom on the driving path of the robot cleaner 100 is a soft area in operation S725.

If the brightness information is greater than or equal to the second threshold value r2, the robot cleaner 100 may determine whether the brightness information is smaller than the third threshold value r3 in operation S730. If the brightness information is smaller than the third threshold value r3, the robot cleaner 100 may determine that the bottom on the driving path of the robot cleaner 100 is a soft area or a hard area in operation S735. In operation S735, the robot cleaner 100 may not clearly identify the characteristic of the bottom, and the operation may be an operation of delaying specific determination.

If the brightness information is greater than or equal to the third threshold value r3, the robot cleaner 100 may identify that the bottom on the driving path is a hard area in operation S740.

After operations S715, S725, S735, and S745, the robot cleaner 100 may determine whether the driving was completed in operation S745. In case the driving was completed, the robot cleaner 100 may not acquire brightness information from the optical sensor 113 anymore. In case the driving was not completed, the robot cleaner 100 may acquire sensing data from the optical sensor 113 for continuously acquiring brightness information.

Figure 8:
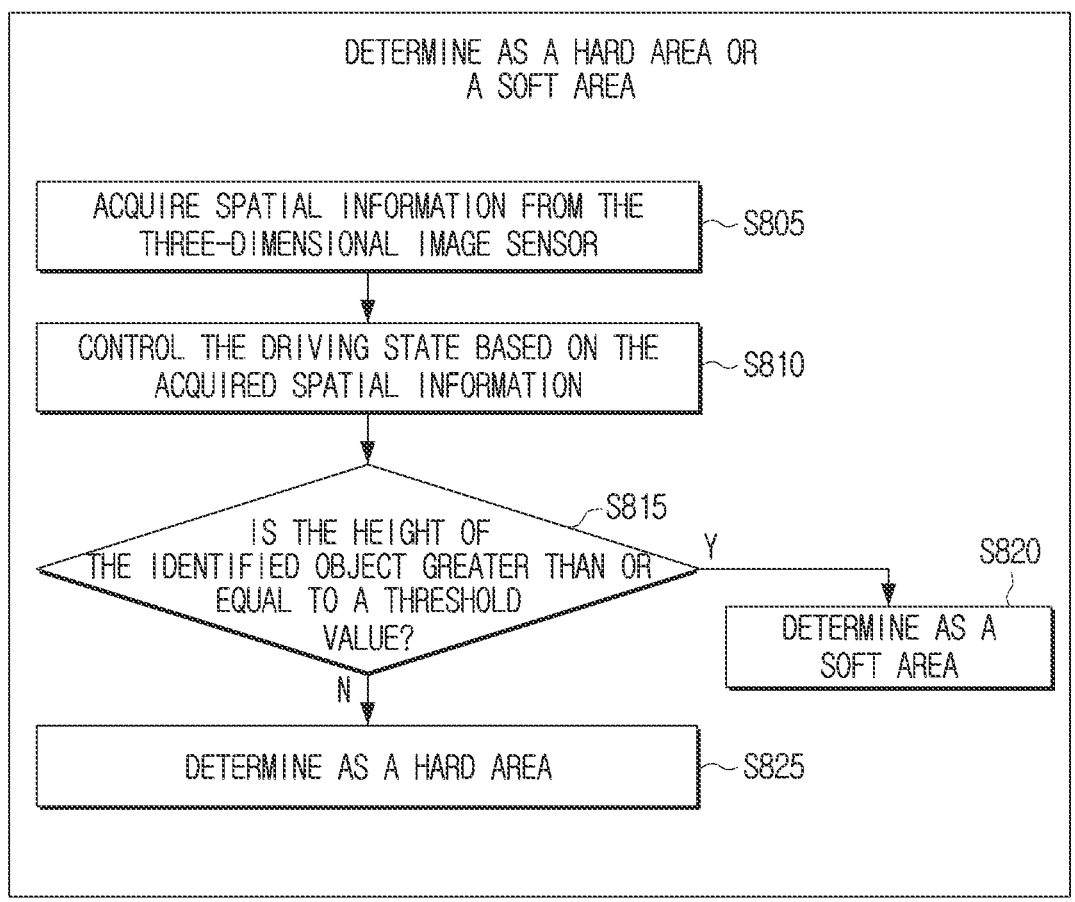
FIG. 8 is a flowchart for illustrating an additional control operation in the embodiment of FIG. 7 according to an embodiment of the disclosure.

FIG. 8 is a flowchart for illustrating an additional control operation in the embodiment of FIG. 7 according to an embodiment of the disclosure.

Referring to FIG. 8, in case brightness information is smaller than the third threshold value r3 in operation S730, the robot cleaner 100 may acquire spatial information from the three-dimensional image sensor 111 in operation S805. In case the brightness information acquired in operation S710 is greater than or equal to r2 and smaller than r3, the robot cleaner 100 may not clearly distinguish whether the bottom is a hard area or a soft area with the brightness information alone. Accordingly, the robot cleaner 100 may identify information on the bottom surface by additionally considering the spatial information other than the brightness information. The robot cleaner 100 may identify an object on the bottom based on the acquired spatial information in operation S810.

The robot cleaner 100 may identify whether a height of the identified object on the bottom is greater than or equal to a threshold value in operation S815. Here, if the height of the object on the bottom is greater than or equal to the threshold value, the robot cleaner 100 may determine that the bottom on the driving path is a soft area in operation S820. Here, if the height of the object on the bottom is smaller than the threshold value, the robot cleaner 100 may determine that the bottom on the driving path is a hard area in operation S825. A soft area may be a carpet, etc., and a hard area may be a marble bottom or a glass bottom. In general, the height value of a soft area may be greater than the height value of a hard area. Accordingly, the robot cleaner 100 may analyze the bottom characteristic according to height information based on a predetermined threshold value.

Here, for considering the height of the object on the bottom (the height of the bottom surface), there should be an opportunity for the robot cleaner 100 to acquire the height of the bottom surface during a driving operation. For example, in the case of running on the second bottom surface having a specific height while running on the first bottom surface, the robot cleaner 100 may acquire the height of the second bottom surface. In case the brightness information for the second bottom surface is greater than or equal to r2 and smaller than r3, the robot cleaner 100 may determine the characteristic of the bottom surface (a soft area or a hard area) in consideration of the height information of the second bottom surface. Here, in case the robot cleaner 100 does not know the height information of the bottom surface, operation S815 is not performed, and the at least one processor 120 may determine the characteristic of the bottom as a basic set value (e.g., the basic set value may be a hard bottom).

Identifying the bottom surface as a soft area or a hard area according to the height of the object on the bottom may vary depending on embodiments. For example, in case the height of the object on the bottom is greater than or equal to a threshold value unlike in FIG. 8, the robot cleaner 100 may determine that the bottom on the driving path is a hard area. This may be a matter that can be changed according to a user's setting.

Figure 9:
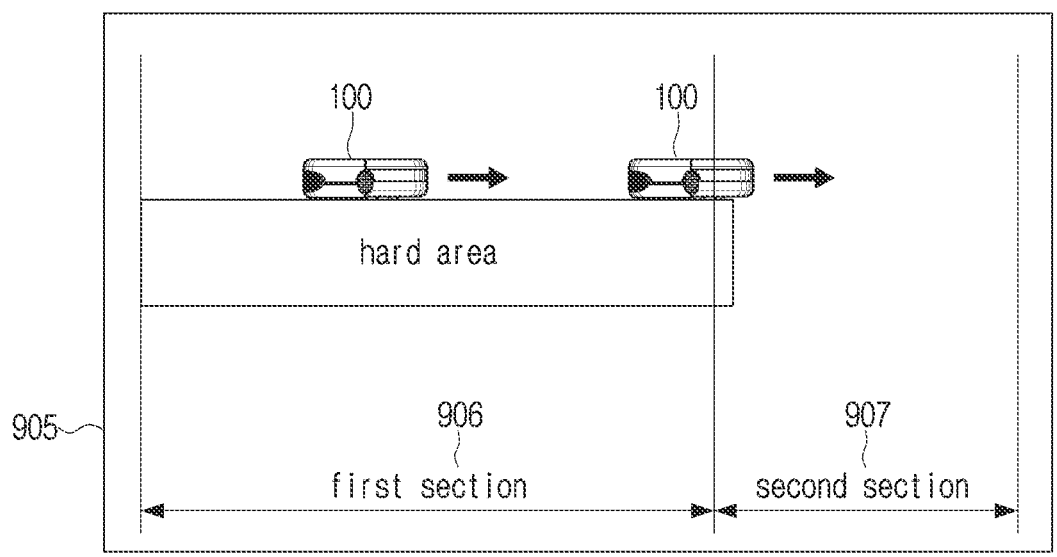
FIG. 9 is a diagram for illustrating sensing data acquired from an optical sensor according to an embodiment of the disclosure.
Figure 9:
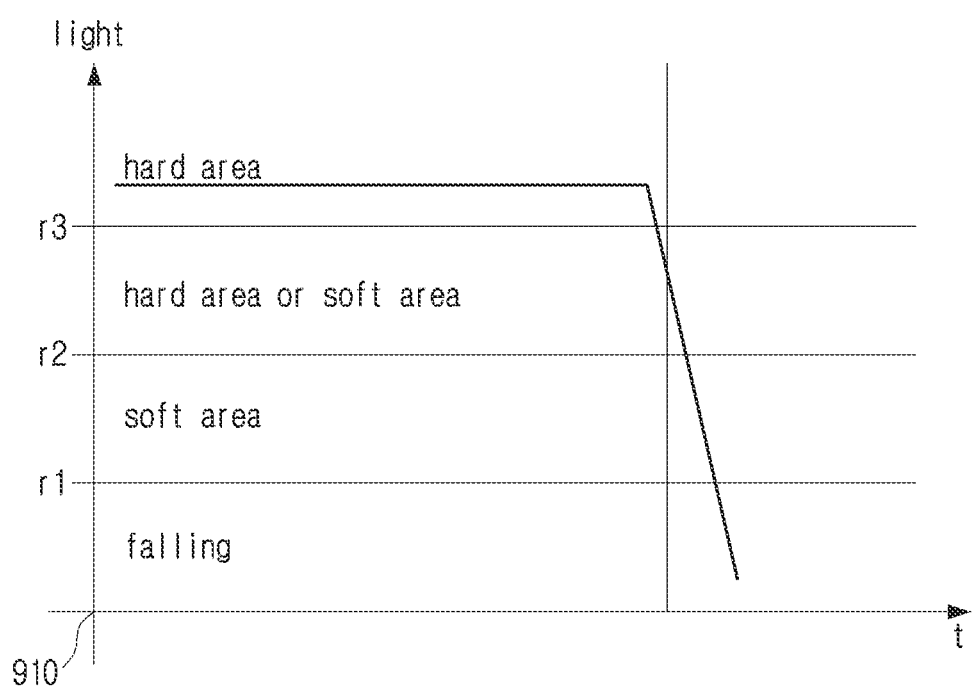

FIG. 9 is a diagram for illustrating sensing data acquired from an optical sensor according to an embodiment of the disclosure.

Referring to FIG. 9, in a first embodiment 905, it is assumed that the robot cleaner 100 runs on a first section 906 including a bottom of a hard area and a second section 907 including a fall risk area.

Table 910 may include information on the amount of change of brightness information according to time. In the first section 906, the robot cleaner 100 is running on a flat hard area, and thus brightness information may be regular. Here, the brightness information may be a value greater than the third threshold value r3. In the second section 907, the robot cleaner 100 may identify that the brightness information drastically falls. Here, if the brightness information drastically falls, the robot cleaner 100 may determine that the robot cleaner 100 is in a fall risk state in the second section 907.

Figure 10:
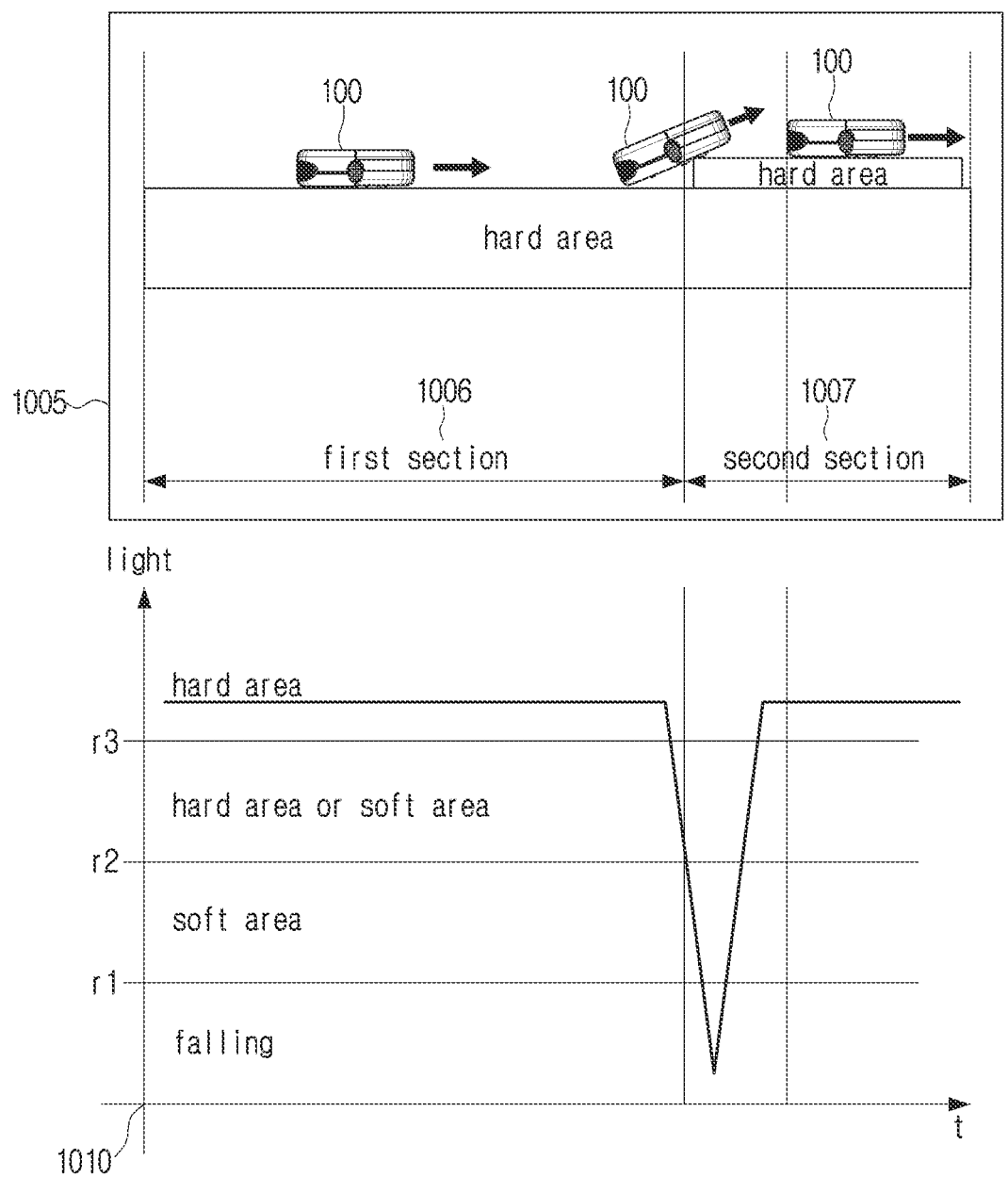
FIG. 10 is another diagram for illustrating sensing data acquired from an optical sensor according to an embodiment of the disclosure.

FIG. 10 is another diagram for illustrating sensing data acquired from an optical sensor according to an embodiment of the disclosure.

Referring to FIG. 10, a second embodiment 1005 may describe an embodiment wherein the robot cleaner 100 runs on a hard area and additionally runs over a hard area.

A first section 1006 may be a section consisting of a flat hard area, and a second section 1007 may be a section wherein there is another hard area on the flat area.

Referring to table 1010, in the first section 1006, brightness information may be maintained to be regular as greater than or equal to the third threshold value r3. However, in case the robot cleaner 100 performs a runover operation over a new hard area in the second section 1007, the brightness information may drastically change. In addition, in case the robot cleaner 100 completed the runover operation, the brightness information may be greater than or equal to the third threshold value r3 again.

Accordingly, in case the brightness information maintained a value greater than the third threshold value r3 and the value drastically changed, and the brightness information maintains a value greater than the third threshold value r3 again, the robot cleaner 100 may identify that it ran over a new hard area while running on a hard area.

Figure 11:
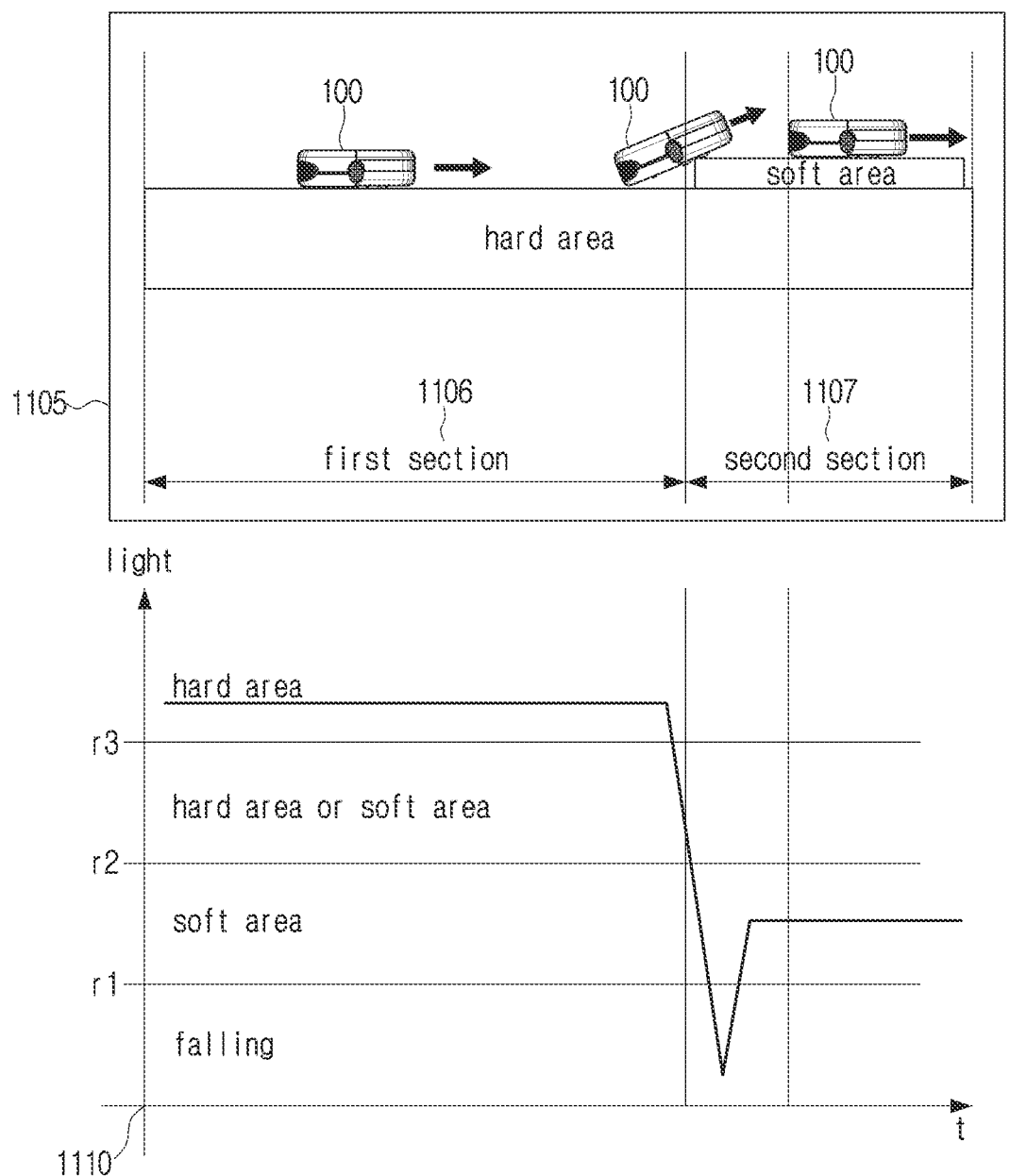
FIG. 11 is another diagram for illustrating sensing data acquired from an optical sensor according to an embodiment of the disclosure.

FIG. 11 is another diagram for illustrating sensing data acquired from an optical sensor according to an embodiment of the disclosure.

Referring to FIG. 11, a third embodiment 1105 may describe an embodiment wherein the robot cleaner 100 runs over a new soft area while running on a hard area.

Referring to table 1110, in a first section 1106, brightness information may be maintained to be regular as greater than or equal to the third threshold value r3. However, in case the robot cleaner 100 performs a runover operation over a new soft area in a second section 1107, the brightness information may drastically change. In addition, in case the robot cleaner 100 completed the runover operation, the brightness information may be greater than or equal to the first threshold value r1 and smaller than the second threshold value r2.

Accordingly, in case the brightness information maintained a value greater than the third threshold value r3 and the value drastically changed, and the brightness information is greater than or equal to the first threshold value r1 and smaller than the second threshold value r2, the robot cleaner 100 may identify that it ran over a new soft area while running on a hard area.

Figure 12:
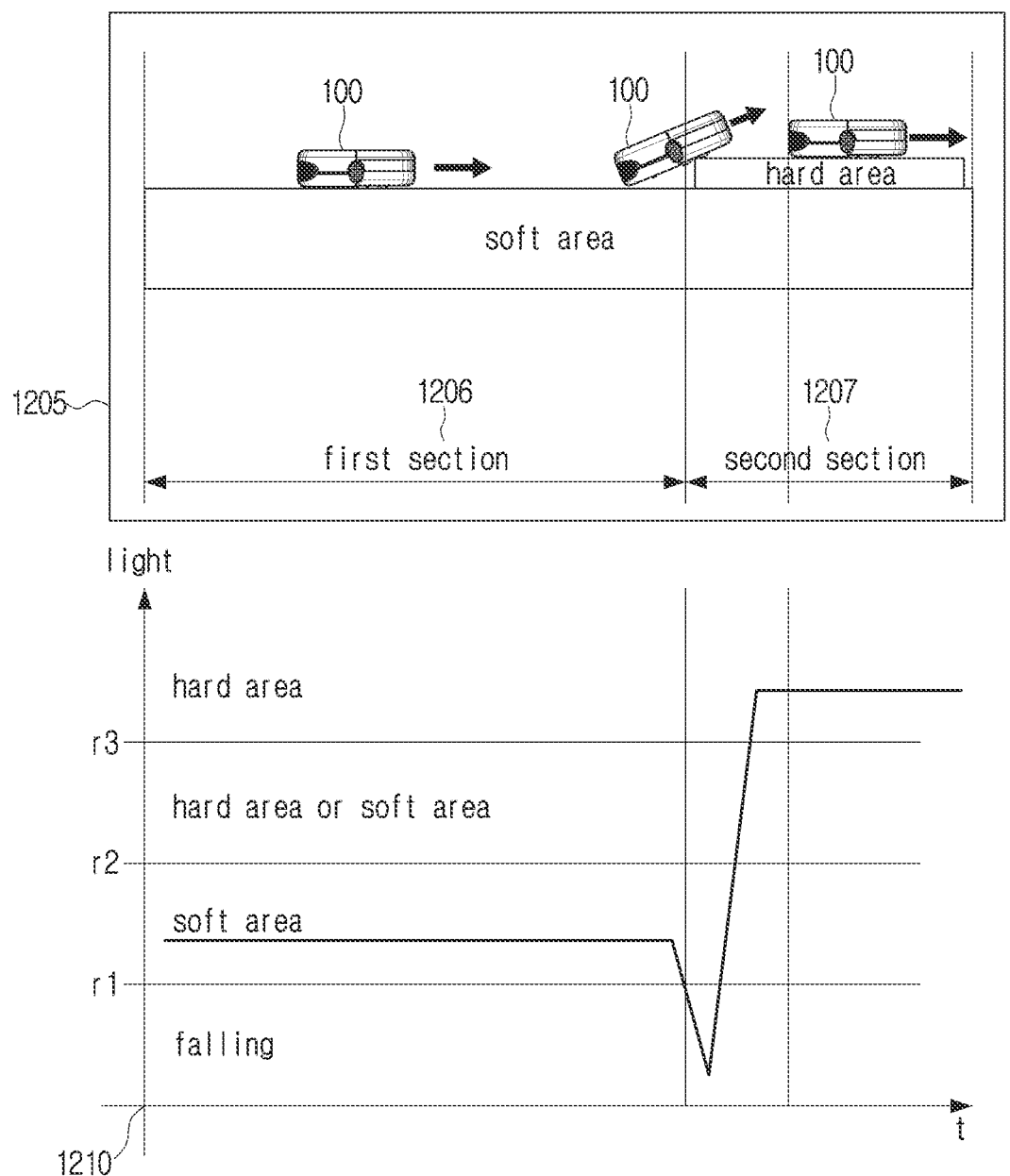
FIG. 12 is another diagram for illustrating sensing data acquired from an optical sensor according to an embodiment of the disclosure.

FIG. 12 is another diagram for illustrating sensing data acquired from an optical sensor according to an embodiment of the disclosure.

Referring to FIG. 12, a third embodiment 1205 may describe an embodiment wherein the robot cleaner 100 runs over a new hard area while running on a soft area.

Referring to table 1210, in a first section 1206, brightness information may be maintained to be regular as greater than or equal to the first threshold value r1 and smaller than the second threshold value r2. However, in case the robot cleaner 100 performs a runover operation over a new hard area in a second section 1207, the brightness information may drastically change. In addition, in case the robot cleaner 100 completed the runover operation, the brightness information may maintain a value greater than the third threshold value r3.

Accordingly, in case the brightness information maintained a value greater than or equal to the first threshold value r1 and smaller than the second threshold value r2 and the value drastically changed, and the brightness information maintains a value greater than the third threshold value r3, the robot cleaner 100 may identify that it ran over a new hard area while running on a soft area.

Figure 13:
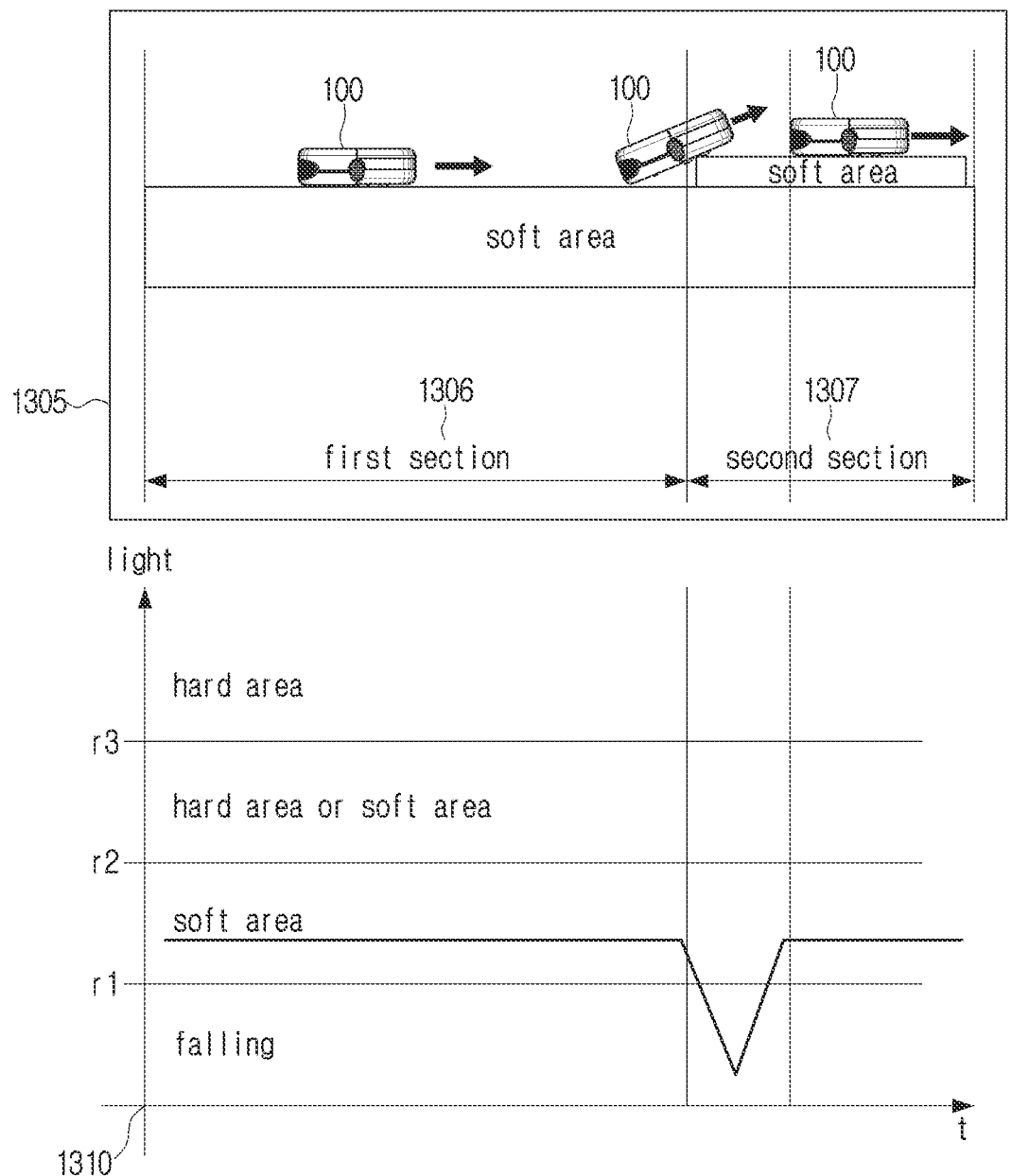
FIG. 13 is another diagram for illustrating sensing data acquired from an optical sensor according to an embodiment of the disclosure.

FIG. 13 is another diagram for illustrating sensing data acquired from an optical sensor according to an embodiment of the disclosure.

Referring to FIG. 13, a third embodiment 1305 may describe an embodiment wherein the robot cleaner 100 runs over a new soft area while running on a soft area.

Referring to table 1310, in a first section 1306, brightness information may be maintained to be regular as greater than or equal to the first threshold value r1 and smaller than the second threshold value r2. However, in case the robot cleaner 100 performs a runover operation over a new soft area in a second section 1307, the brightness information may drastically change. In addition, in case the robot cleaner 100 completed the runover operation, the brightness information may be greater than or equal to the first threshold value r1 and smaller than the second threshold value r2.

Accordingly, in case the brightness information maintained a value greater than or equal to the first threshold value r1 and smaller than the second threshold value r2 and the value drastically changed, and the brightness information is greater than or equal to the first threshold value r1 and smaller than the second threshold value r2, the robot cleaner 100 may identify that it ran over a new soft area while running on a soft area.

Figure 14:
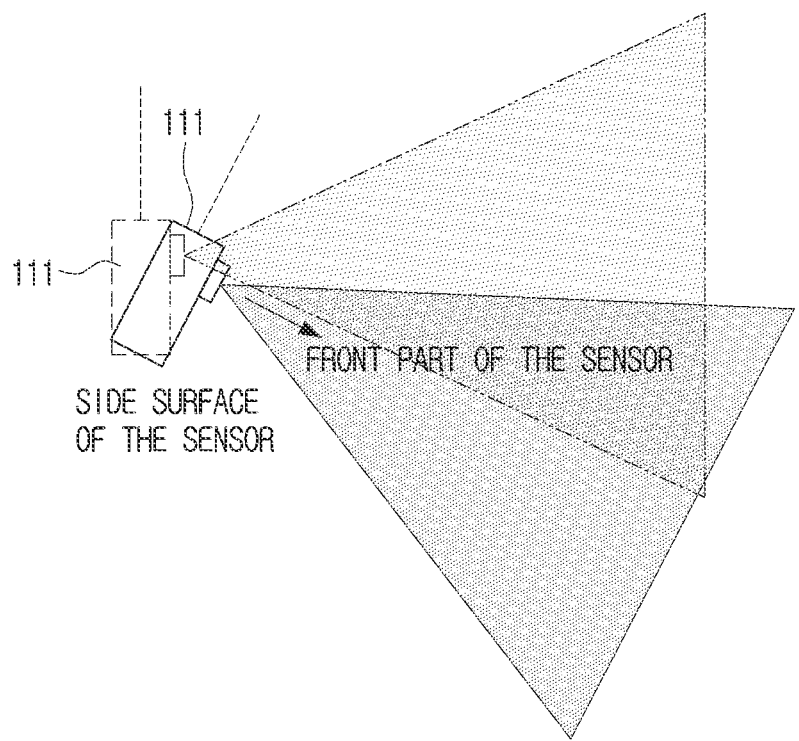
FIG. 14 is a diagram for illustrating an arrangement angle of a three-dimensional image sensor included in a robot cleaner according to an embodiment of the disclosure.

FIG. 14 is a diagram for illustrating an arrangement angle of a three-dimensional image sensor included in a robot cleaner according to an embodiment of the disclosure.

Referring to FIG. 14, the three-dimensional image sensor 111 may be arranged on the robot cleaner 100 in various ways.

According to an embodiment of the disclosure, the three-dimensional image sensor 111 may be arranged to constitute 90 degrees with the bottom toward the front part. Here, the upper field of view and the lower field of view of the three-dimensional image sensor 111 may be the same.

According to another embodiment of the disclosure, the three-dimensional image sensor 111 may be arranged in a state of being tilted toward the lower direction as much as the threshold angle. Here, when the three-dimensional image sensor 111 is tilted toward the lower direction as much as the threshold angle, the field of view may change based on the threshold angle. For example, the three-dimensional image sensor 111 may acquire spatial information for the bottom portion located on the lower side as a wider field of view.

Figure 15:
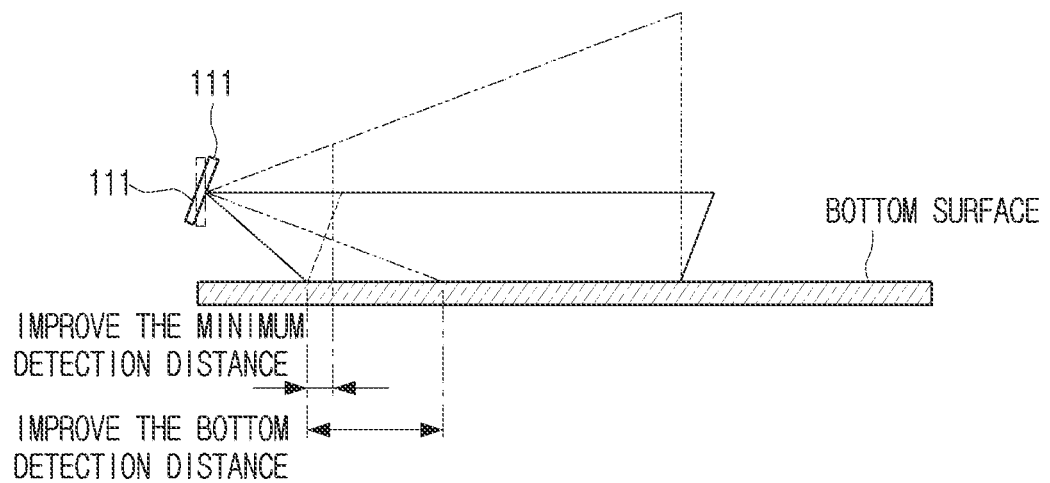
FIG. 15 is a diagram for illustrating a difference in a field of view according to an arrangement angle of a three-dimensional image sensor according to an embodiment of the disclosure.

FIG. 15 is a diagram for illustrating a difference in a field of view according to an arrangement angle of a three-dimensional image sensor according to an embodiment of the disclosure.

Referring to FIG. 15, the three-dimensional image sensor 111 may be arranged based on a minimum detection distance in a first embodiment and a minimum bottom detection distance in a second embodiment.

According to the first embodiment, the three-dimensional image sensor 111 may be arranged to constitute 90 degrees with the bottom toward the front part.

According to the second embodiment, the three-dimensional image sensor 111 may be arranged in a state of being tilted toward the lower direction as much as the threshold angle.

In the second embodiment, the three-dimensional image sensor 111 is in a state of being tilted toward the lower direction as much as the threshold angle. Thus, the minimum detection distance of identifying a specific object may be shorter than the minimum detection distance in the first embodiment, and the minimum distance of detecting the bottom may be shorter than the minimum distance in the first embodiment.

In case the arrangement angle of the three-dimensional image sensor 111 is changed toward the lower direction as much as the threshold angle, the field of view on the bottom side may become wider.

As the three-dimensional image sensor 111 is tilted more toward the lower side (as the arrangement angle toward the lower side becomes bigger), the minimum detection distance may become shorter. In addition, as the minimum detection distance becomes shorter, the detection performance for an obstacle in a short distance can be improved.

In addition, as the three-dimensional image sensor 111 is tilted more toward the lower side, the bottom detection distance may become shorter. The aforementioned minimum detection distance is a minimum distance of identifying both the bottom and an obstacle through the three-dimensional image sensor 111, and the bottom detection distance may describe a minimum distance of recognizing the bottom through the three-dimensional image sensor 111. If the bottom detection distance becomes shorter, the area where the field of view (FOV) meets the bottom increases (the bottom surface that can be recognized increases), and the bottom detection performance can be improved.

In addition, as the three-dimensional image sensor 111 is tilted more toward the lower side, an incident angle for the bottom surface can be improved. The three-dimensional image sensor 111 may irradiate a pattern light toward the front part for detecting an obstacle. Because a pattern light is a light, as an incident angle of meeting an object is bigger, detection for an obstacle is more difficult, and a probability that total reflection would occur may become higher. Accordingly, if the three-dimensional image sensor 111 is arranged to be tilted toward the lower side, an incident angle of meeting an obstacle may become smaller, and the bottom detection performance can be improved.

Figure 16:
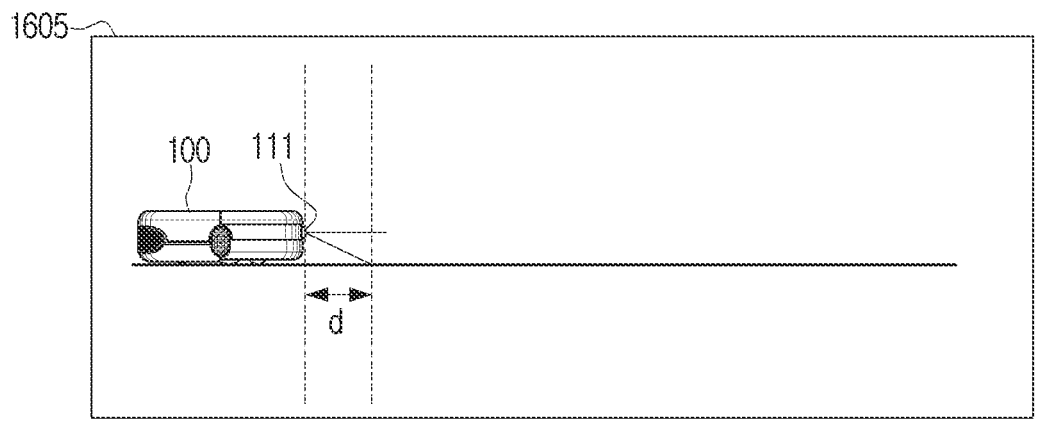
FIG. 16 is a diagram for illustrating a case wherein an arrangement angle of a three-dimensional image sensor varies according to a type and a driving path of a robot cleaner according to an embodiment of the disclosure.
Figure 16:
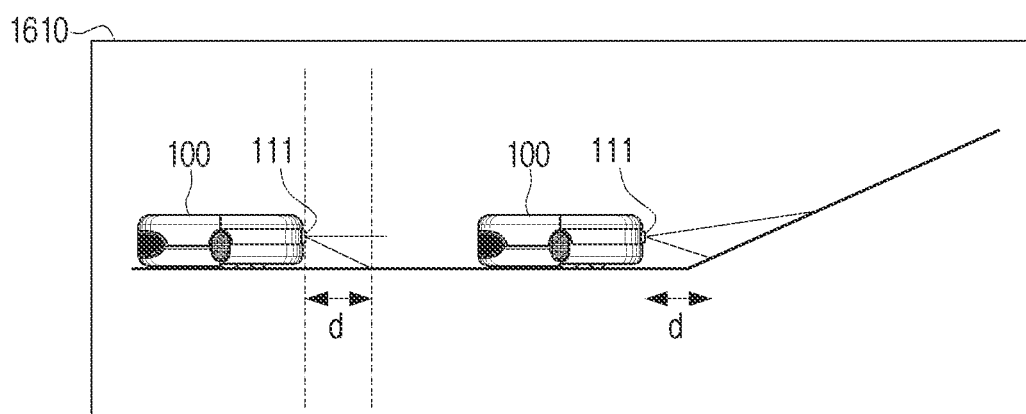
Figure 16:
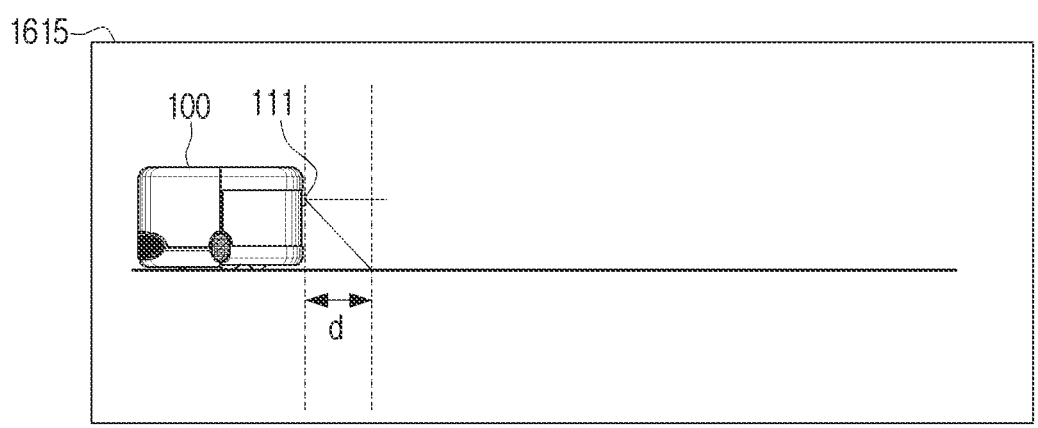

FIG. 16 is a diagram for illustrating a case wherein an arrangement angle of a three-dimensional image sensor varies according to a type and a driving path of a robot cleaner according to an embodiment of the disclosure.

Referring to FIG. 16, a minimum bottom detection distance "d" may be the same according to a first embodiment 1605, second embodiment 1610, and third embodiment 1615. However, depending on the individual embodiments, the arrangement angle of the three-dimensional image sensor 111 may be different. For the convenience of explanation, it is assumed that the threshold angle is 0 degrees in case the three-dimensional image sensor 111 faces the front surface, and the threshold angle is 90 degrees in case the three-dimensional image sensor 111 faces the lower side.

In the first embodiment 1605, it is assumed that the robot cleaner 100 runs on a general flat bottom. If the minimum bottom detection distance of the robot cleaner 100 is set, the robot cleaner 100 may change the arrangement angle of the three-dimensional image sensor 111 in a corresponding manner to the minimum bottom detection distance.

In the second embodiment 1610, it is assumed that the robot cleaner 100 was running on a general flat bottom and then runs on a tilted bottom. In the case of running on a tilted bottom, the robot cleaner 100 may change the arrangement angle of the three-dimensional image sensor 111 so that the minimum bottom detection distance is increased. This is because the accuracy of sensing data acquired from the optical sensor 113 just before the bottom is tilted may be low. Accordingly, the robot cleaner 100 may change the arrangement angle of the three-dimensional image sensor 111 to increase the minimum bottom detection distance. Specifically, the robot cleaner 100 may set the three-dimensional image sensor 111 to reduce the threshold angle.

The third embodiment 1615 is an embodiment wherein the height of the robot cleaner 100 is high. Even if the three-dimensional image sensor 111 is the same, the arrangement location of the three-dimensional image sensor 111 may be different according to the height of the robot cleaner 100. In the third embodiment 1615, if the height of the robot cleaner 100 is high, the threshold angle of the three-dimensional image sensor 111 may be increased more to maintain the minimum bottom detection distance.

Figure 17:
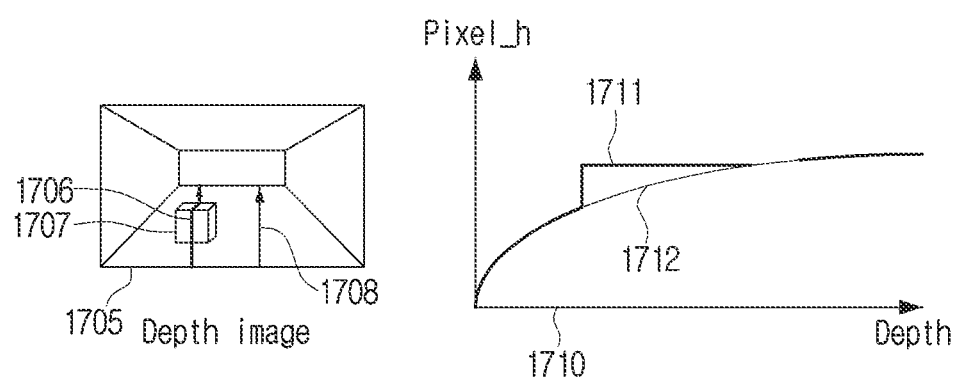
FIG. 17 is a diagram for illustrating an operation of analyzing data acquired from a three-dimensional image sensor according to an embodiment of the disclosure.

FIG. 17 is a diagram for illustrating an operation of analyzing data acquired from a three-dimensional image sensor according to an embodiment of the disclosure.

Referring to FIG. 17, the robot cleaner 100 may acquire sensing data from the three-dimensional image sensor 111. The robot cleaner 100 may acquire information distinguished into the x axis (the depth) and the y axis (the pixel height) as in table 1710. A first line 1711 may be a line wherein an object was identified, and a second line 1712 may be a line wherein an object was not identified.

Then, the robot cleaner 100 may acquire spatial information based on the information acquired from the table 1710. The spatial information may be three-dimensional spatial information 1705. In the three-dimensional spatial information 1705, a line 1707 may correspond to the first line 1711 in the table 1710, and the robot cleaner 100 may identify whether an object 1706 exists and location information based on the first line 1711 acquired from the table 1710. In addition, line 1708 may correspond to the second line 1712 in the table 1710.

Here, the first line 1711 and the second line 1712 may not be identified simultaneously. The robot cleaner 100 may acquire spatial information based on sensing data acquired from the three-dimensional image sensor 111.

For example, in case the robot cleaner 100 acquired sensing data such as the first line 1711 in the table 1710, the robot cleaner 100 may identify the object 1706, and acquire spatial information including the line 1707. Then, in case the robot cleaner 100 acquired sensing data such as the second line 1712 in the table 1710, the robot cleaner 100 may acquire spatial information including the line 1708.

The method described in FIG. 17 may be a driving bottom surface extraction method. The robot cleaner 100 may acquire depth information based on sensing data acquired from the three-dimensional image sensor 111, and extract a bottom plane based on the depth information. The depth information of the bottom plane may be expressed as a continuous graph 1712 (the second line). In contrast, if there is an obstacle, the depth information may be expressed as a discontinuous graph 1711 (the first line). Based on such a characteristic, the robot cleaner 100 may acquire information on a bottom plane and an obstacle.

According to another embodiment of the disclosure, the robot cleaner 100 may additionally use an extraction method of a vector of a representative bottom plane other than the aforementioned driving bottom surface extraction method. The robot cleaner 100 may assume the current angle of the robot cleaner 100 based on the vector of the representative bottom plane, and correct information on the driving bottom surface based on the assumed angle.

According to another embodiment of the disclosure, the robot cleaner 100 may additionally use the gyro sensor 112. In a situation wherein the tilt of the robot cleaner 100 suddenly changes drastically, the robot cleaner 100 may use the gyro sensor 112. As the gyro sensor 112 has a sensing delay which is relatively faster than other sensors, the gyro sensor 112 may respond fast in a situation wherein the posture of the robot cleaner 100 suddenly changes.

Figure 18:
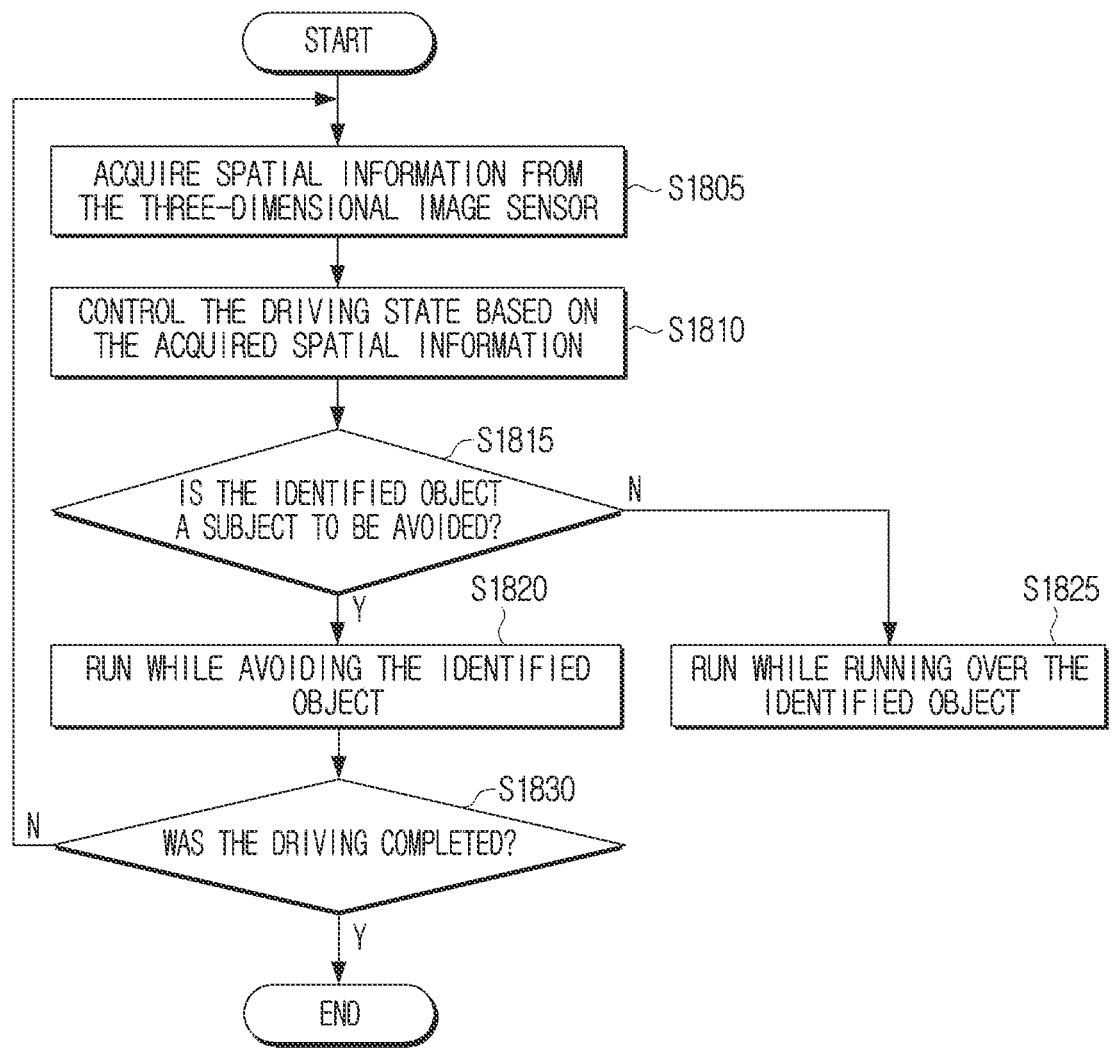
FIG. 18 is a flowchart for illustrating a control operation of a robot cleaner of identifying an object and determining whether to avoid the object according to an embodiment of the disclosure.

FIG. 18 is a flowchart for illustrating a control operation of a robot cleaner of identifying an object and determining whether to avoid the object according to an embodiment of the disclosure.

Referring to FIG. 18, the robot cleaner 100 may acquire spatial information from the three-dimensional image sensor 111 in operation S1805. Then, the robot cleaner 100 may control the driving state of the robot cleaner 100 based on the acquired spatial information in operation S1810. Then, the robot cleaner 100 may identify whether the identified object is a subject to be avoided in operation S1815. Here, the object which is a subject to be avoided may be set in advance.

In case the identified object is a subject to be avoided, the robot cleaner 100 may control the driving state such that it runs while avoiding the identified object in operation S1820. In addition, in case the identified object is not a subject to be avoided, the robot cleaner 100 may control the driving state such that it runs while running over the identified object in operation S1825.

The robot cleaner 100 may determine whether the driving was completed in operation S1830 after operation S1820 and operation S1825. Here, in case the driving was completed, the robot cleaner 100 may not acquire spatial information from the three-dimensional image sensor 111 anymore. In case the driving was not completed, the robot cleaner 100 may continuously acquire spatial information from the three-dimensional image sensor 111.

The robot cleaner 100 may control the driving state such that it avoids the subject using a bigger radius than the actual size of the subject to be avoided (an obstacle). Here, the subject to be avoided may be recognized through the three-dimensional image sensor 111 or the object recognition sensor 118. In case an object is recognized through the three-dimensional image sensor 111, the width, length, and height information of the object can be acquired, and accuracy of recognition for the object can be improved.

Figure 19:
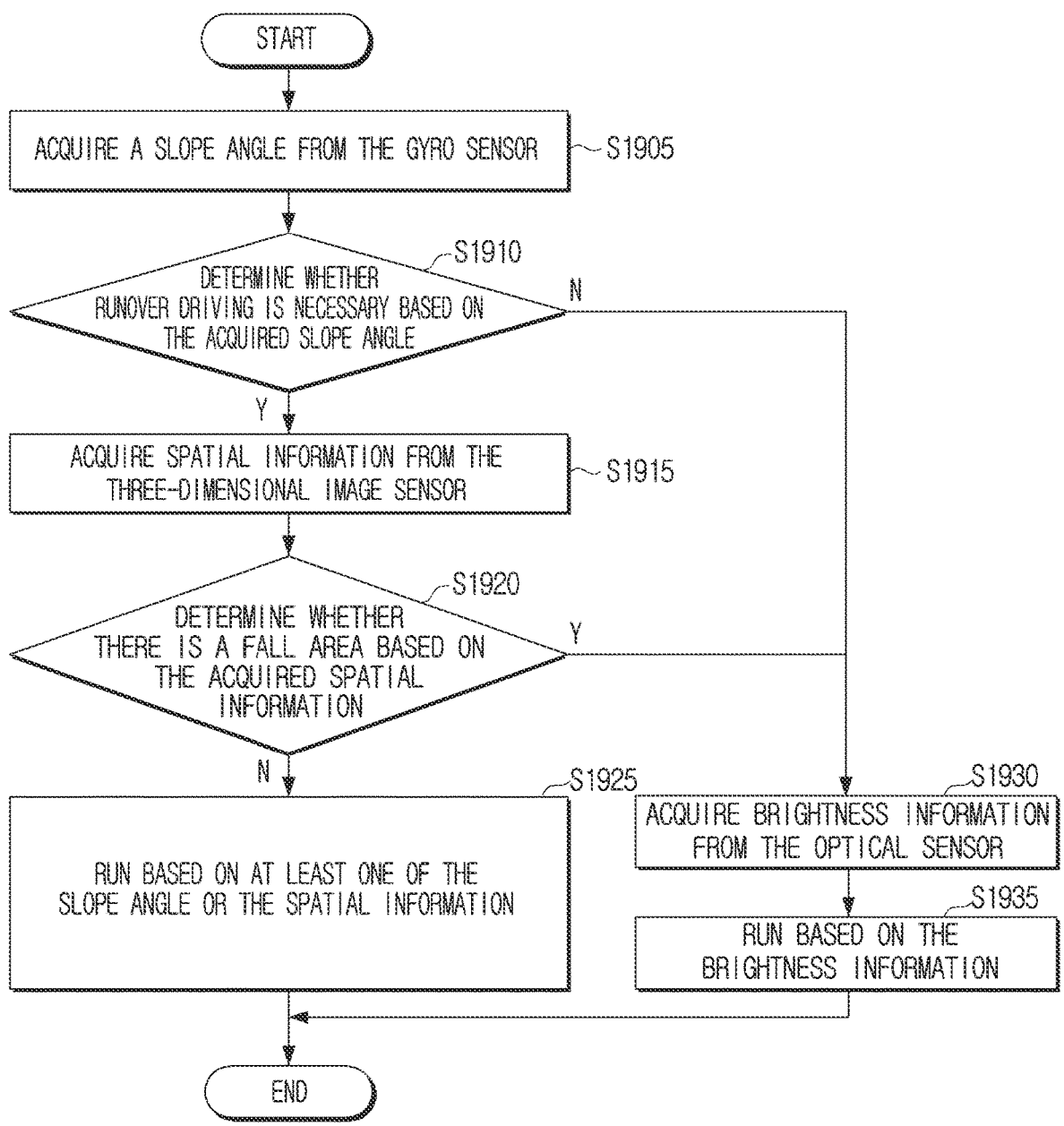
FIG. 19 is a flowchart for illustrating a control operation of a robot cleaner of determining a fall area according to an embodiment of the disclosure.

FIG. 19 is a flowchart for illustrating a control operation of a robot cleaner of determining a fall area according to an embodiment of the disclosure.

Referring to FIG. 19, the robot cleaner 100 may acquire a slope angle from the gyro sensor 112 in operation S1905. Then, the robot cleaner 100 may determine whether runover driving is necessary based on the acquired slope angle in operation S1910. Here, if the robot cleaner 100 determines that runover driving is not necessary, the robot cleaner 100 may acquire brightness information from the optical sensor 113 in operation S1930. Then, the robot cleaner 100 may control the driving state such that it runs based on the brightness information in operation S1935.

Here, if the robot cleaner 100 determines that runover driving is necessary, the robot cleaner 100 may acquire spatial information from the three-dimensional image sensor 111 in operation S1915. Then, the robot cleaner 100 may determine whether there is a fall area based on the acquired spatial information in operation S1920. Here, if it is identified that there is a fall area, the robot cleaner 100 may acquire brightness information from the optical sensor 113 in operation S1930. Then, the robot cleaner 100 may control the driving state such that it runs based on the brightness information in operation S1935.

If a fall area is not identified, the robot cleaner 100 may control the driving state such that it runs based on at least one of the slope angle or the spatial information in operation S1925.

Figure 20:
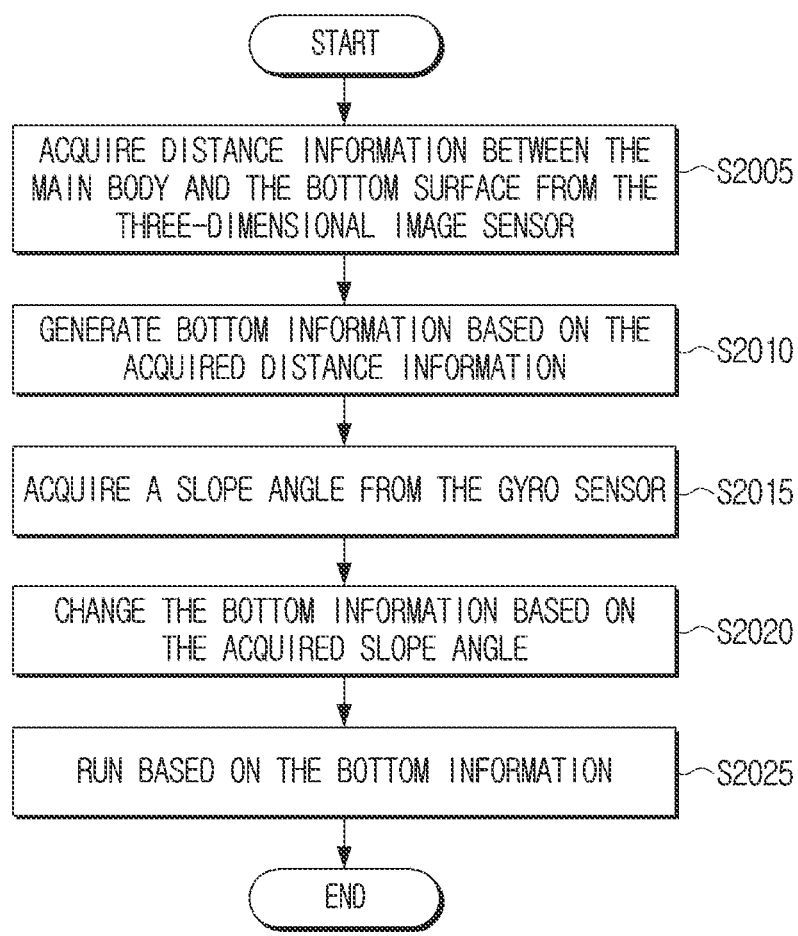
FIG. 20 is a flowchart for illustrating a control operation of a robot cleaner of changing bottom information according to an embodiment of the disclosure.

FIG. 20 is a flowchart for illustrating a control operation of a robot cleaner of changing bottom information according to an embodiment of the disclosure.

Referring to FIG. 20, the robot cleaner 100 may acquire distance information between the main body and the bottom surface from the three-dimensional image sensor 111 in operation S2005. Specifically, the robot cleaner 100 may acquire sensing data from the three-dimensional image sensor 111, and analyze the acquired sensing data and acquire distance information. Then, the robot cleaner 100 may generate bottom information based on the acquired distance information in operation S2010. Then, the robot cleaner 100 may acquire a slope angle from the gyro sensor 112 in operation S2015. Then, the robot cleaner 100 may change the bottom information based on the acquired slope angle in operation S2020. Then, the robot cleaner 100 may control the driving state such that it runs based on the changed bottom information in operation S2025.

Figure 21:
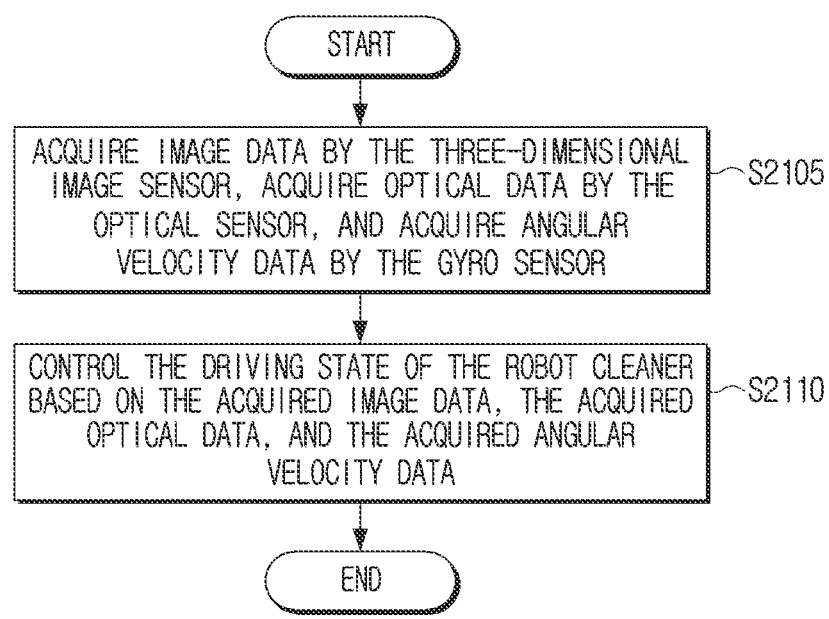
FIG. 21 is a flowchart for illustrating a control operation of a robot cleaner according to an embodiment of the disclosure.

FIG. 21 is a flowchart for illustrating a control operation of a robot cleaner according to an embodiment of the disclosure.

Referring to FIG. 21, in a controlling method of the robot cleaner 100 according to an embodiment of the disclosure, image data may be acquired by the three-dimensional image sensor 111, and optical data may be acquired by the optical sensor 113, and angular velocity data may be acquired by the gyro sensor 112 in operation S2105.

In addition, in the controlling method, the driving state of the robot cleaner 100 may be controlled based on the acquired image data, the acquired optical data, and the acquired angular velocity data in operation S2110.

Here, the three-dimensional image sensor 111 and the optical sensor 113 are respectively arranged to be tilted by a predetermined tilting angle, and the tilting angle by which the three-dimensional image sensor 111 is tilted may be smaller than the tilting angle by which the optical sensor 113 is tilted.

Here, the three-dimensional image sensor 111 may be arranged to be tilted by a tilting angle determined based on the arrangement height of the three-dimensional image sensor 111, the field of view of the three-dimensional image sensor 111, and the minimum detection distance of the three-dimensional image sensor 111.

The optical sensor 113 may be arranged in a lower location than the location wherein the three-dimensional image sensor 111 is arranged.

The optical sensor 113 and the three-dimensional image sensor 111 may be arranged outside the housing of the robot cleaner 100.

The arrangement height information of the three-dimensional image sensor 111 may be between 35 mm and 85 mm, and the determined tilting angle may be between 0 degrees and 19 degrees.

The optical sensor 113 may be arranged to detect an area between the wheel (not shown) of the robot cleaner 100 and the minimum detection distance of the three-dimensional image sensor 111.

In operation S2110 of controlling the driving state, spatial information may be acquired based on the image data acquired from the three-dimensional image sensor 111, and the driving state of the robot cleaner 100 may be controlled based on the acquired spatial information, and a slope angle indicating a degree that the robot cleaner 100 is tilted may be acquired based on an X value and a Y value among an X value, a Y value, and a Z value acquired from the gyro sensor 112, and if the slope angle is greater than or equal to a threshold value, the acquired spatial information may be changed based on the slope angle, and the driving state of the robot cleaner 100 may be controlled based on the changed spatial information.

In operation S2110 of controlling the driving state, if the time than the slope angle is maintained to be greater than or equal to the threshold value is greater than or equal to a threshold time, the spatial information may be changed based on the acquired slope angle and the driving state of the robot cleaner 100 may be controlled based on the changed spatial information, and if the time that the slope angle is maintained to be greater than or equal to the threshold value is less than the threshold time, the driving state of the robot cleaner 100 may be controlled based on the slope angle.

In operation S2110 of controlling the driving state, if it is identified that a fall risk area exists based on the acquired spatial information, a fall possibility may be identified based on the sensing data acquired from the optical sensor 113, and the driving state of the robot cleaner 100 may be controlled based on the fall possibility.

In operation S2110 of controlling the driving state, in case a bottom characteristic is not identified based on the sensing data acquired from the optical sensor 113, an object located on the bottom may be identified based on the acquired spatial information, and if the object is identified, the height of the object may be identified, and the bottom characteristic may be identified based on the identified height of the object.

In operation S2110 of controlling the driving state, an object that is located on the driving path of the robot cleaner 100 may be identified based on the acquired spatial information, and if the identified object is a prestored subject to be avoided, the driving state of the robot cleaner 100 may be controlled to avoid the object, and if the identified object is not a prestored subject to be avoided, the driving state of the robot cleaner 100 may be controlled to run over the object.

Methods according to the aforementioned various embodiments of the disclosure may be implemented in forms of applications that can be installed on a conventional electronic device to then function as the robot cleaner 100.

In addition, the methods according to the aforementioned various embodiments of the disclosure may be implemented by software upgrade, or hardware upgrade of a conventional electronic device to then function as the robot cleaner 100.

In addition, the aforementioned various embodiments of the disclosure may be performed through an embedded server provided on an electronic device (e.g., the robot cleaner 100), or an external server of at least one of an electronic device (e.g., the robot cleaner 100) or a display device.

According to an embodiment of the disclosure, the aforementioned various embodiments may be implemented as software including instructions stored in machine-readable storage media, which can be read by machines (e.g., computers). The machines refer to devices that call instructions stored in a storage medium, and can operate according to the called instructions, and the devices may include an electronic device according to the aforementioned embodiments (e.g., the robot cleaner 100). In case an instruction is executed by a processor (e.g., the at least one processor 120), the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' describes a storage medium that does not include signals and is tangible, but does not indicate whether data is stored in the storage medium semi-permanently or temporarily.

In addition, according to an embodiment of the disclosure, the methods according to the aforementioned various embodiments may be provided while being included in a computer program product. The computer program product can be traded between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least temporarily stored in a storage medium such as a server of a manufacturer, a server of an application store, or a memory of a relay server, or may be temporarily generated.

In addition, each of the components (e.g., a module or a program) according to the aforementioned various embodiments may be comprised of a single entity or a plurality of entities, and some sub-components among the aforementioned sub-components may be omitted, or different sub-components may be further included in the various embodiments. Alternatively or additionally, some components (e.g., modules or programs) may be integrated into one entity to perform the same or similar functions performed by each component prior to integration. Operations performed by a module, a program, or another component, in accordance with the various embodiments, may be performed sequentially, in parallel, repetitively, or in a heuristic manner, or at least some operations may be performed in a different order, omitted, or a different operation may be added.

Figure 22:
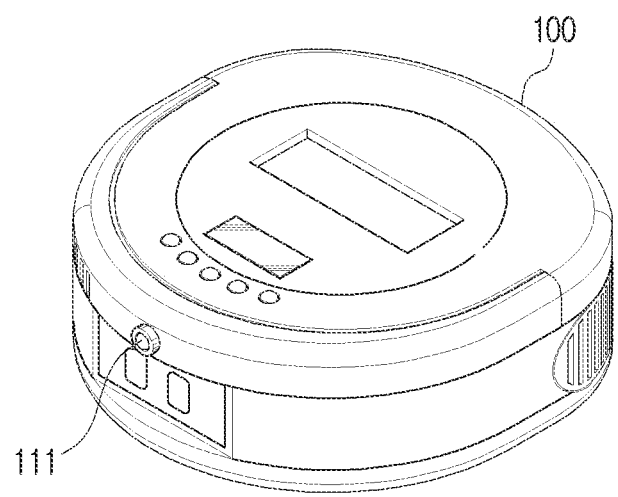
FIG. 22 is a perspective view for illustrating an exterior of a robot cleaner according to an embodiment of the disclosure.

FIG. 22 is a perspective view for illustrating an exterior of a robot cleaner according to an embodiment of the disclosure.

Referring to FIG. 22, the robot cleaner 100 may include three-dimensional image sensor 111 in the front surface part of the main body. The three-dimensional image sensor 111 may collect various information necessary for identifying the front part of the robot cleaner 100 and controlling the driving state. For example, the three-dimensional image sensor 111 may be arranged in the front surface part of the robot cleaner 100, and acquire a front side image of the robot cleaner 100.

Figure 23:
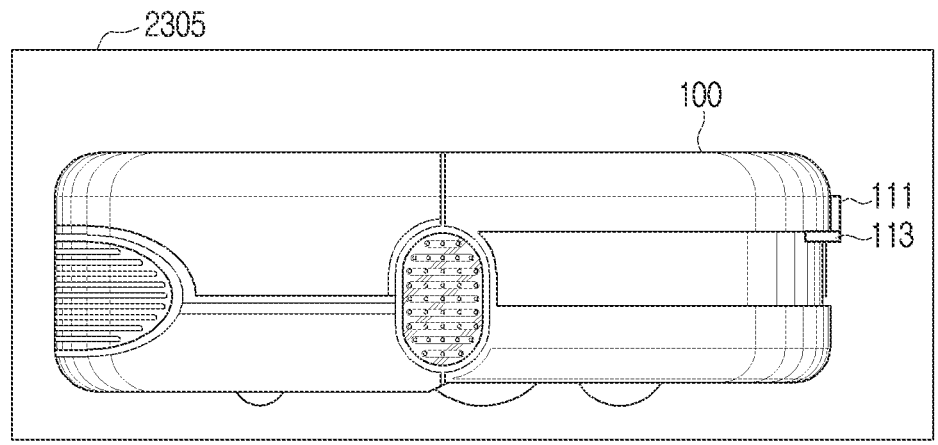
FIG. 23 are elevational views for illustrating arrangements of a three-dimensional image sensor and an optical sensor arranged on a robot cleaner according to an embodiment of the disclosure.
Figure 23:
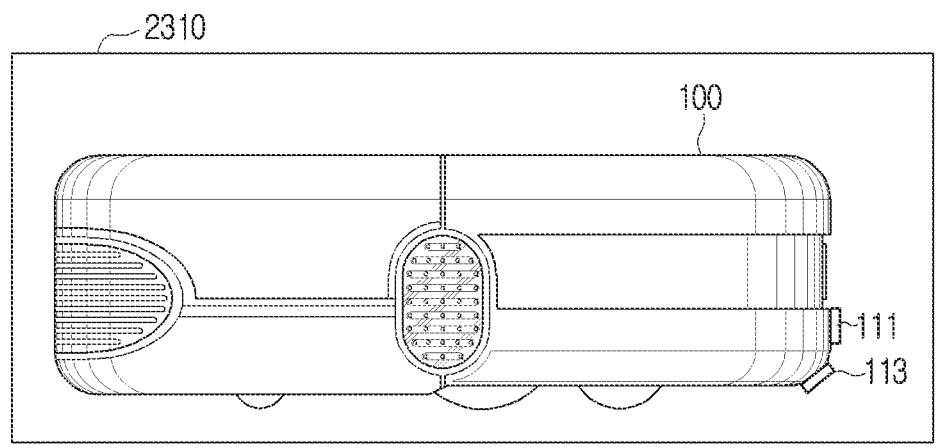
Figure 23:
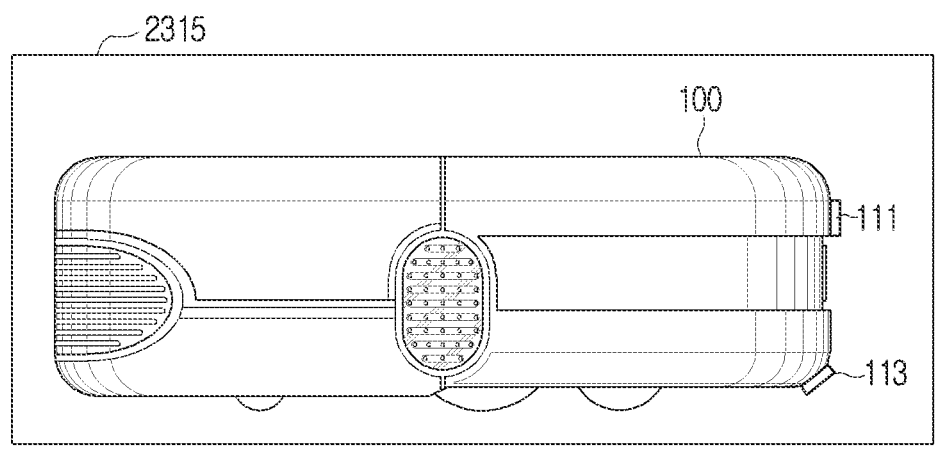

FIG. 23 is a diagram are elevational views for illustrating arrangements of a three-dimensional image sensor and an optical sensor arranged on a robot cleaner according to an embodiment of the disclosure.

Referring to FIG. 23, the robot cleaner 100 may include the three-dimensional image sensor 111 and the optical sensor 113. Here, the optical sensor 113 may be arranged to be located in the lower part of the three-dimensional image sensor 111.

For the convenience of explanation, the robot cleaner 100 may be divided into a front surface upper part and a front surface lower part. The front surface upper part of the robot cleaner 100 may describe a part that corresponds to a height higher than the middle part in the vertical height of the perspective view illustrated in FIG. 23, and the front surface lower part of the robot cleaner 100 may describe a part that corresponds to a height lower than the middle part in the vertical height of the perspective view illustrated in FIG. 23.

According to a first embodiment 2305, both of the three-dimensional image sensor 111 and the optical sensor 113 may be located in the front surface upper part of the robot cleaner 100. Here, the optical sensor 113 may be located in a location lower than the three-dimensional image sensor 111, but embodiments are not limited thereto. The robot cleaner 100 according to the first embodiment 2305 may be advantageous for acquiring information on an object that exists in a far distance or a space wherein the robot cleaner 100 is running, and analyzing the information.

According to a second embodiment 2310, both of the three-dimensional image sensor 111 and the optical sensor 113 may be located in the front surface lower part of the robot cleaner 100. Here, the optical sensor 113 may be located in a location lower than the three-dimensional image sensor 111, but embodiments are not limited thereto. The robot cleaner 100 according to the second embodiment 2310 may be advantageous for acquiring information regarding the state of the bottom, and analyzing the information.

According to a third embodiment 2315, the three-dimensional image sensor 111 may be located in the front surface upper part of the robot cleaner 100, and the optical sensor 113 may be located in the front surface lower part of the robot cleaner 100. Here, the optical sensor 113 may be located in a location lower than the three-dimensional image sensor 111, but embodiments are not limited thereto. The robot cleaner 100 according to the third embodiment 2315 may be advantageous for acquiring information regarding not only an object that exists in a far distance, but also information regarding the bottom surface that exists in a short distance, and analyzing the information.

However, the robot cleaner 100 is not limited to the first embodiment 2305 to the third embodiment 2315, and various arrangement methods may be applied according to the type of the robot cleaner 100 and the main use of the robot cleaner 100.

Figure 24:
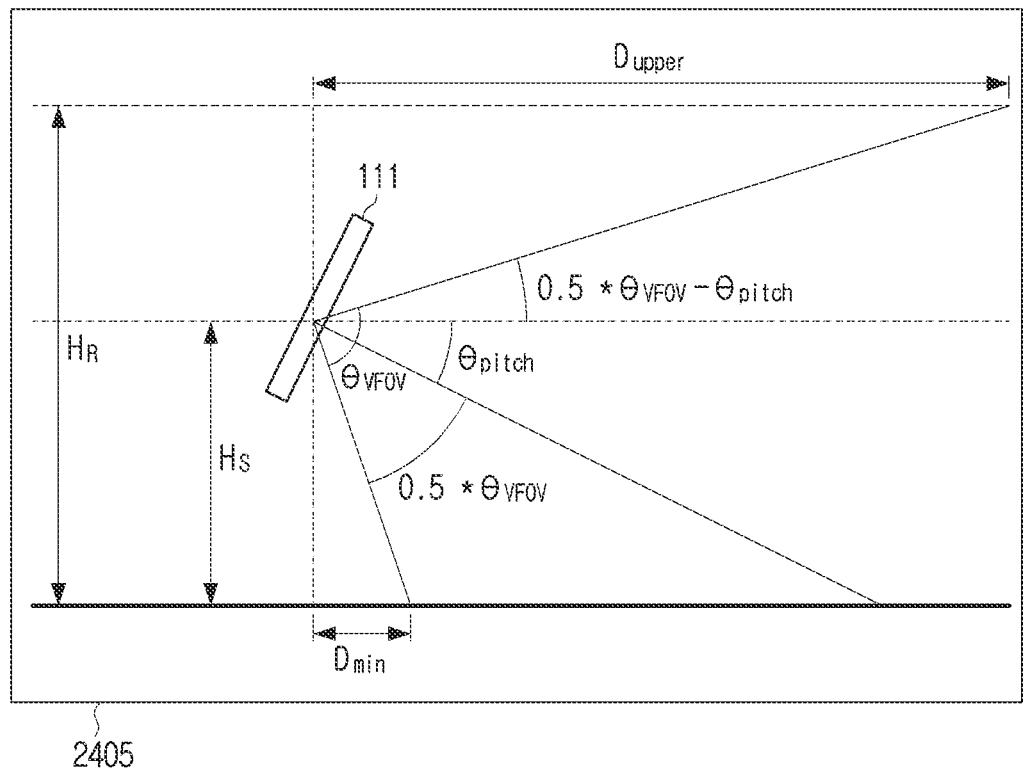
FIG. 24 is a diagram for illustrating a tilting angle by which a three-dimensional image sensor is tilted according to an embodiment of the disclosure.

FIG. 24 is a diagram for illustrating a tilting angle by which a three-dimensional image sensor is tilted according to an embodiment of the disclosure.

Referring to FIG. 24, the three-dimensional image sensor 111 may be arranged in a state of being tilted toward the bottom surface in driving of the robot cleaner 100.

Referring to an arrangement plan 2405 of the three-dimensional image sensor 111, H_R may describe the maximum height that can be recognized by the three-dimensional image sensor 111. H_S may describe the height from the bottom surface to the three-dimensional image sensor 111. D_upper may describe the minimum upper side distance that can be recognized by the three-dimensional image sensor 111. D_min may describe the minimum lower side distance that can be recognized by the three-dimensional image sensor 111. θ_VFOV may describe the field of view of the three-dimensional image sensor 111. θ_pitch may describe an angle tilted toward the bottom surface based on the horizontal line in the driving direction of the robot cleaner 100.

Here, in case θ_pitch changes, the values of D_upper and D_min may also change.

Equation 1 (2410) may be a formula expressing the relation of H_S, D_min, θ_pitch and θ_VFOV. Accordingly, as some values among the values of H_S, D_min, θ_pitch and θ_VFOV change, the other values may be calculated according to Equation 1 (2410).

Equation 2 (2415) may be a formula that modifies Equation 1 (2410). Equation 2 (2415) may be used in determining the optimal angle of the three-dimensional image sensor 111. Here, it is assumed that the minimum lower distance that can be recognized by the three-dimensional image sensor 111 is fixed. It is assumed that D_min is 100 mm. Here, if the height H_S of the three-dimensional image sensor 111, and the field of view θ_VFOV of the three-dimensional image sensor 111 are determined in the process of manufacturing the robot cleaner 100, the optimal angle( ) for the minimum lower distance that can be recognized by the three-dimensional image sensor 111 may be calculated. Then, the manufacturer may install the three-dimensional image sensor 111 on the robot cleaner 100 based on the calculated angle θ_pitch.

Equation 3 (2420) may be a formula expressing the relation of H_R, H_S, D_upper, θ_pitch and θ_VFOV. Here, if values for H_S, H_R, θ_pitch and θ_VFOV are acquired, D_upper may be calculated.

$$D_{upper} = \frac{H_R - H_S}{\tan(0.5 * \theta_{VFOV} - \theta_{pitch})} \qquad \text{Equation 3}$$

Figure 25:
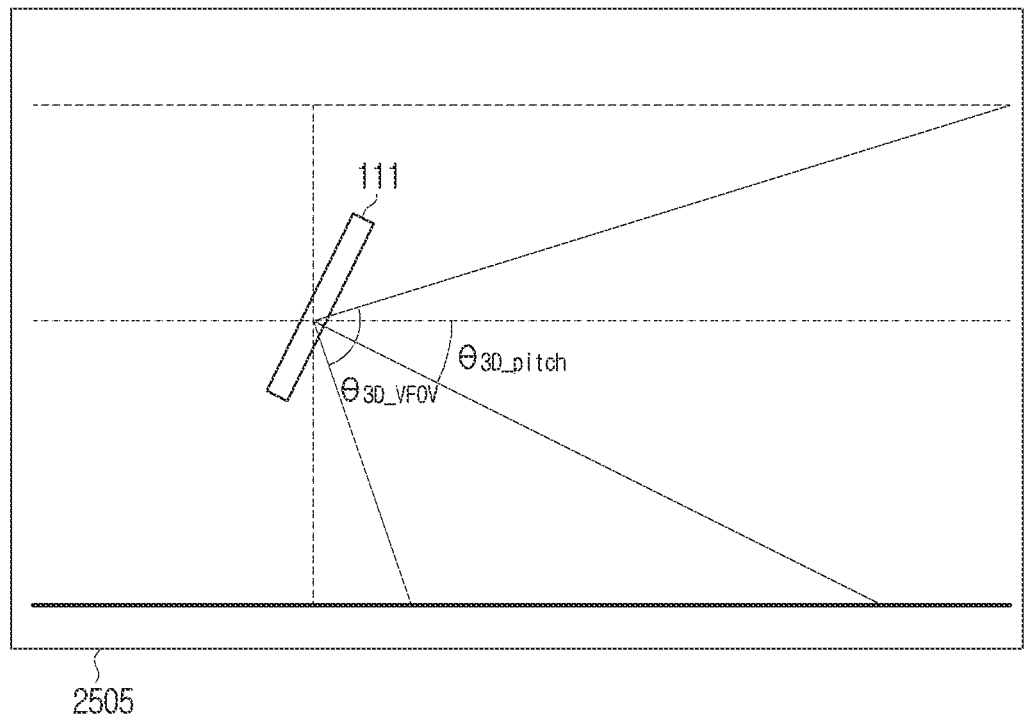
FIG. 25 is a diagram for illustrating respective field of views and tilting angles of a three-dimensional image sensor and an optical sensor according to an embodiment of the disclosure.
Figure 25:
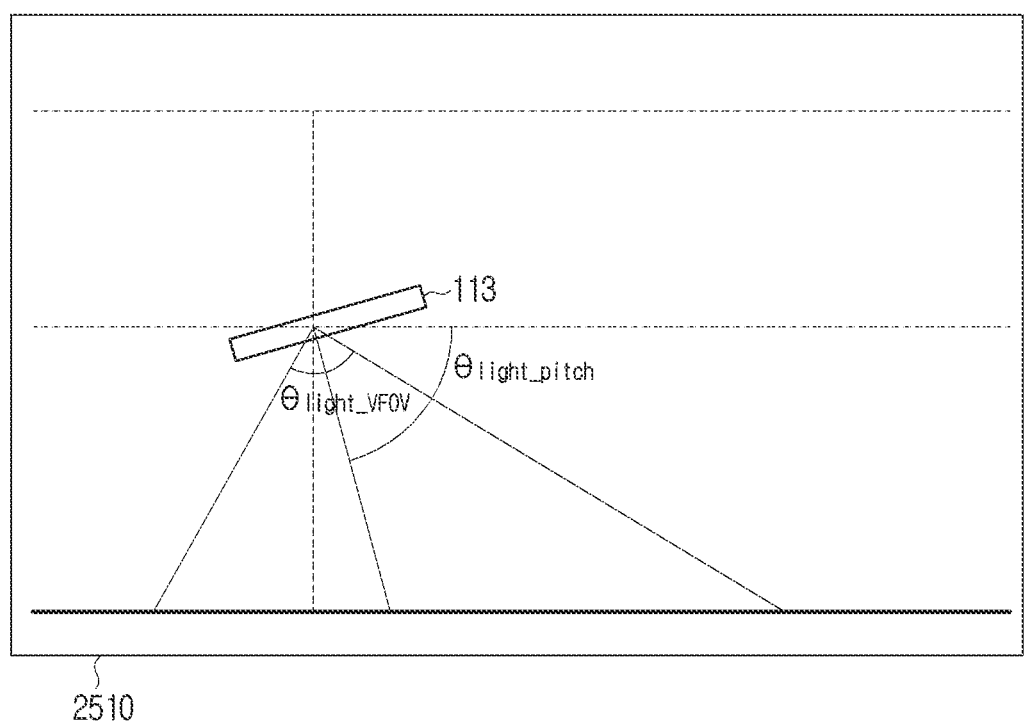

FIG. 25 is a diagram for illustrating respective field of views and tilting angles of a three-dimensional image sensor and an optical sensor according to an embodiment of the disclosure.

Referring to a perspective view 2505 of the θ_light_pitch in FIG. 25, the field of view of the three-dimensional image sensor 111 may be θ_3D_VFOV. In addition, the tilting angle by which the three-dimensional image sensor 111 is tilted toward the bottom surface may be θ_3D_pitch.

Referring to a perspective view 2510 of the optical sensor 113 in FIG. 25, the field of view of the optical sensor 113 may be θ_light_VFOV. In addition, the tilting angle by which the optical sensor 113 is tilted toward the bottom surface may be θ_light_pitch.

Here, the field of view of the three-dimensional image sensor 111 and the field of view of the optical sensor 113 may vary according to the types of the sensors.

Here, the tilting angle θ_light_pitch by which the optical sensor 113 is tilted toward the bottom surface may be bigger than the tilting angle θ_3D_pitch by which the three-dimensional image sensor 111 is tilted toward the bottom surface. That is, the optical sensor 113 may be arranged in a state of being tilted more toward the bottom surface than the three-dimensional image sensor 111. As the optical sensor 113 falls under a sensor for detecting a light reflected from the bottom surface, and the three-dimensional image sensor 111 falls under a sensor for identifying an object in the front side, the optical sensor 113 may be arranged in a state of being tilted more toward the lower side than the three-dimensional image sensor 111.

Figure 26:
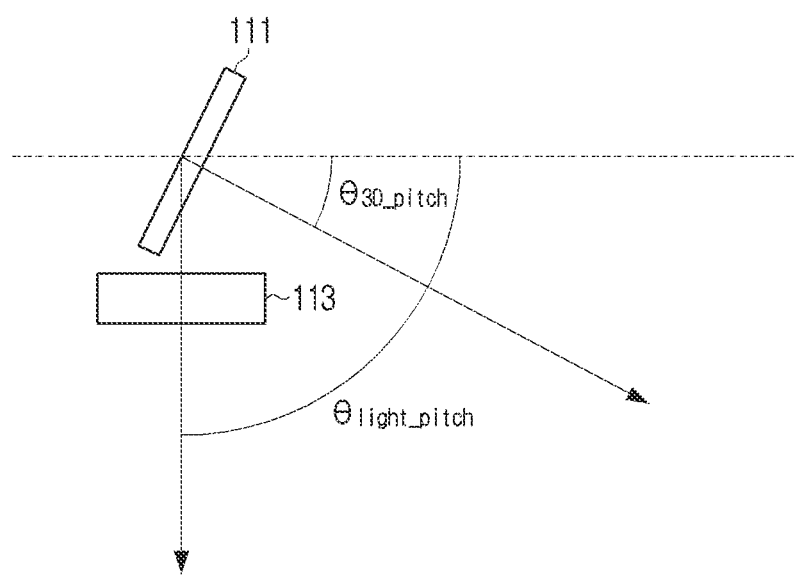
FIG. 26 is a diagram for illustrating a difference in tilting angles of a three-dimensional image sensor and an optical sensor according to an embodiment of the disclosure.

FIG. 26 is a diagram for illustrating a difference in tilting angles of a three-dimensional image sensor and an optical sensor according to an embodiment of the disclosure.

Referring to FIG. 26, the tilting angles by which the three-dimensional image sensor 111 and the optical sensor 113 are tilted toward the bottom surface are described simultaneously. As described in FIG. 25, the tilting angle θ_light_pitch by which the optical sensor 113 is tilted toward the bottom surface may be bigger than the tilting angle θ_3D_pitch by which the three-dimensional image sensor 111 is tilted toward the bottom surface.

The optical sensor 113 may be arranged in a lower location than the three-dimensional image sensor 111.

Figure 27:
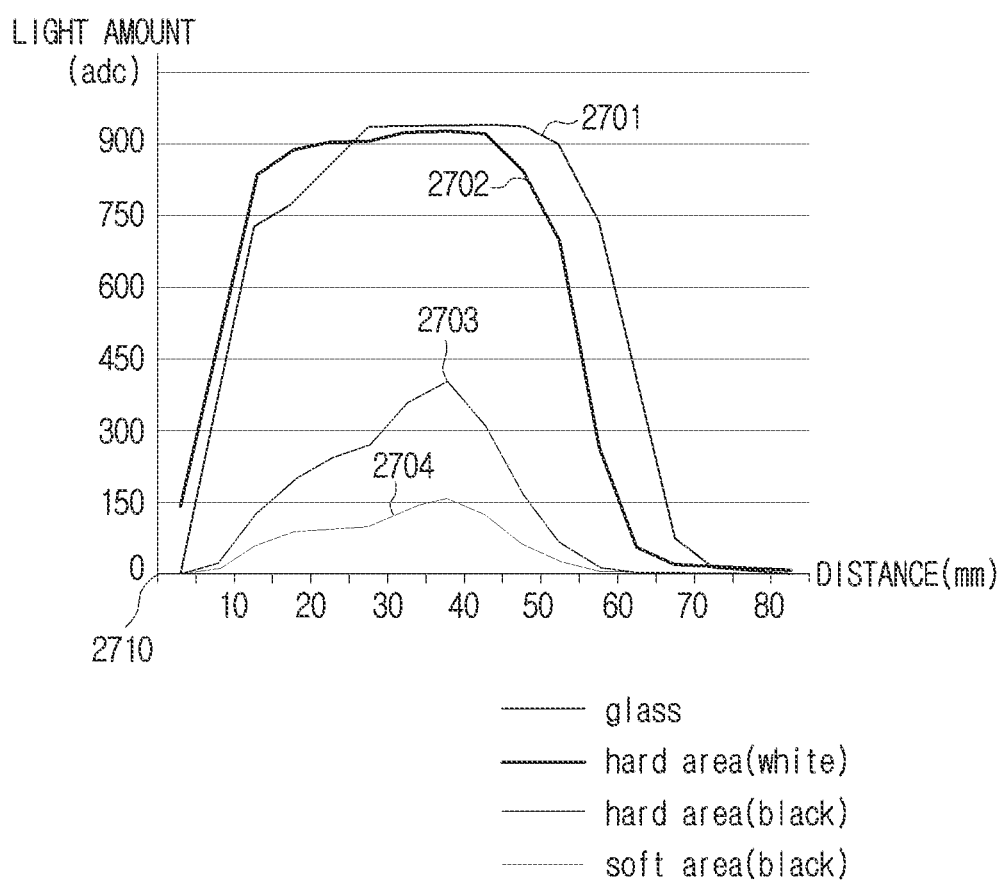
FIG. 27 is a diagram for illustrating an operation of analyzing optical data acquired from an optical sensor according to an embodiment of the disclosure.

FIG. 27 is a diagram for illustrating an operation of analyzing optical data acquired from an optical sensor according to an embodiment of the disclosure.

Referring to FIG. 27, the optical sensor 113 may acquire different optical data according to the distance from the bottom surface to the optical sensor 113. Specifically, as the distance from the bottom surface to the optical sensor 113 decreases or increases, a light amount that is acquired (i.e., optical data) may vary.

Table 2710 includes content where a light amount changes according to a different material of the bottom surface and the distance from the bottom surface to the optical sensor 113. The material of the bottom surface may be glass, a white hard area, a black hard area, and a black soft area.

The table 2710 may include a change of a light amount 2701 for glass, a change of a light amount 2702 for a white hard area, a change of a light amount 2703 for a black hard area, and a change of a light amount 2704 for a black soft area.

Referring to the table 2710, in case the bottom surface is glass or a hard area, a light amount may be acquired to be relatively high. In addition, as the bottom surface is a softer area, a light amount may be acquired to be relatively low.

Here, a light amount may vary according to the color of the bottom surface. For example, even if the bottom surface is the same hard area, if the color of the hard area is brighter, a light amount may be acquired to be relatively high.

In addition, a light amount may vary according to the distance from the bottom surface to the optical sensor 113. In case the distance from the bottom surface to the optical sensor 113 is too close or too far, a light amount may be acquired to be relatively low.

As the robot cleaner 100 should determine a driving state based on various bottom surfaces, the optical sensor 113 may be arranged in a range wherein a difference in a light amount can be clearly identified based on the table 2710. Specifically, the optical sensor 113 may be arranged such that the distance from the optical sensor 113 to the bottom surface has a value between 15 mm and 45 mm. As a light amount can be clearly compared in the section, the material of the bottom surface can be clearly distinguished.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A robot cleaner comprising:
   a three-dimensional image sensor;
   an optical sensor;
   a gyro sensor; and
   at least one processor configured to:
     control a driving state of the robot cleaner based on image data acquired by the three-dimensional image sensor, optical data acquired by the optical sensor, and angular velocity data acquired by the gyro sensor,
     acquire spatial information based on the image data acquired from the three-dimensional image sensor,
     change the acquired spatial information based on the angular velocity data acquired from the gyro sensor, and
     control the driving state of the robot cleaner based on the changed spatial information,
   wherein the three-dimensional image sensor is arranged to be tilted by a first predetermined tilting angle and the optical sensor is arranged to be tilted by a second predetermined tilting angle, and
   wherein the first predetermined tilting angle of the three-dimensional image sensor is smaller than the second predetermined tilting angle of the optical sensor.

2. The robot cleaner of claim 1,
   wherein the optical sensor is arranged to be lower than a location of the three-dimensional image sensor.

3. The robot cleaner of claim 1, wherein the optical sensor and the three-dimensional image sensor are arranged outside a housing of the robot cleaner.

4. The robot cleaner of claim 1,
   wherein arrangement height information of the three-dimensional image sensor is between 35 mm and 85 mm, and
   wherein the first predetermined tilting angle is between 0 degrees and 19 degrees.

5. The robot cleaner of claim 1,
   wherein the first predetermined tilting angle of the three-dimensional image sensor is determined based on an arrangement height of the three-dimensional image sensor, a field of view of the three-dimensional image sensor, and a minimum detection distance of the three-dimensional image sensor, and
   wherein the optical sensor is arranged to detect an area between a wheel of the robot cleaner and the minimum detection distance of the three-dimensional image sensor.

6. The robot cleaner of claim 1, wherein the at least one processor is further configured to:
   control the driving state of the robot cleaner based on the acquired spatial information,
   acquire a slope angle indicating a degree that the robot cleaner is tilted based on an X value and a Y value among an X value, a Y value, and a Z value acquired from the gyro sensor,
   based on the slope angle being greater than or equal to a threshold value, change the acquired spatial information based on the slope angle, and
   control the driving state of the robot cleaner based on the changed spatial information.

7. The robot cleaner of claim 6, wherein the at least one processor is further configured to:
   based on a time that the slope angle is maintained to be greater than or equal to the threshold value being greater than or equal to a threshold time, change the spatial information based on the acquired slope angle,
   control the driving state of the robot cleaner based on the changed spatial information, and
   based on the time that the slope angle is maintained to be greater than or equal to the threshold value being smaller than the threshold time, control the driving state of the robot cleaner based on the slope angle.

8. The robot cleaner of claim 7, wherein the at least one processor is further configured to:
based on identifying that a fall risk area exists based on the acquired spatial information, identify a fall possibility based on sensing data acquired from the optical sensor, and
control the driving state of the robot cleaner based on the fall possibility.

9. The robot cleaner of claim 1, wherein the at least one processor is further configured to:
based on a bottom characteristic not being identified based on sensing data acquired from the optical sensor, identify an object located under the robot cleaner based on acquired spatial information,
based on the object being identified, identify a height of the object, and
identify the bottom characteristic based on the identified height of the object.

10. The robot cleaner of claim 1, wherein the at least one processor is further configured to:
identify an object located on a driving path of the robot cleaner based on acquired spatial information,
based on the identified object being a prestored subject to be avoided, control the driving state of the robot cleaner to avoid the object, and
based on the identified object not being the prestored subject to be avoided, control the driving state of the robot cleaner to run over the object.

11. A controlling method of a robot cleaner, the controlling method comprising:
acquiring image data by a three-dimensional image sensor;
acquiring optical data by an optical sensor;
acquiring angular velocity data by a gyro sensor;
controlling a driving state of the robot cleaner based on the acquired image data, the acquired optical data, and the acquired angular velocity data;
acquiring spatial information based on the image data acquired from the three-dimensional image sensor;
changing the acquired spatial information based on the angular velocity data acquired from the gyro sensor; and
controlling the driving state of the robot cleaner based on the changed spatial information,
wherein the three-dimensional image sensor is arranged to be titled by a first predetermined tilting angle and the optical sensor is arranged to be tilted by a second predetermined tilting angle, and
wherein the first predetermined tilting angle of the three-dimensional image sensor is smaller than the second predetermined tilting angle of the optical sensor.

12. The controlling method of the robot cleaner of claim 11,
wherein the optical sensor is arranged to be lower than a location of the three-dimensional image sensor.

13. The controlling method of the robot cleaner of claim 11, wherein the optical sensor and the three-dimensional image sensor are arranged outside a housing of the robot cleaner.

14. The controlling method of the robot cleaner of claim 11,
wherein arrangement height information of the three-dimensional image sensor is between 35 mm and 85 mm, and
wherein the first predetermined tilting angle is between 0 degrees and 19 degrees.

15. The controlling method of the robot cleaner of claim 11,
wherein the first predetermined tilting angle of the three-dimensional image sensor is determined based on an arrangement height of the three-dimensional image sensor, a field of view of the three-dimensional image sensor, and a minimum detection distance of the three-dimensional image sensor, and
wherein the optical sensor is configured to detect an area between a wheel of the robot cleaner and the minimum detection distance of the three-dimensional image sensor.

16. The controlling method of the robot cleaner of claim 11, wherein the controlling of the driving state further comprises:
controlling the driving state of the robot cleaner based on the acquired spatial information;
acquiring a slope angle indicating a degree that the robot cleaner is tilted based on an X value and a Y value among an X value, a Y value, and a Z value acquired from the gyro sensor;
based on the slope angle being greater than or equal to a threshold value, changing the acquired spatial information based on the slope angle; and
controlling the driving state of the robot cleaner based on the changed spatial information.

17. The controlling method of the robot cleaner of claim 16, wherein the controlling of the driving state further comprises:
based on a time that the slope angle is maintained to be greater than or equal to the threshold value being greater than or equal to a threshold time, changing the spatial information based on the acquired slope angle;
controlling the driving state of the robot cleaner based on the changed spatial information; and
based on the time that the slope angle is maintained to be greater than or equal to the threshold value being smaller than the threshold time, controlling the driving state of the robot cleaner based on the slope angle.

18. The controlling method of the robot cleaner of claim 17, wherein the controlling of the driving state further comprises:
based on identifying that a fall risk area exists based on the acquired spatial information, identifying a fall possibility based on sensing data acquired from the optical sensor; and
controlling the driving state of the robot cleaner based on the fall possibility.

19. The controlling method of the robot cleaner of claim 11, wherein the controlling of the driving state further comprises:
based on a bottom characteristic not being identified based on sensing data acquired from the optical sensor, identifying an object located under the robot cleaner based on acquired spatial information; and
based on the object being identified, identifying a height of the object, and identifying the bottom characteristic based on the identified height of the object.

20. The controlling method of the robot cleaner of claim 11, wherein the controlling of the driving state further comprises:
identifying an object located on a driving path of the robot cleaner based on acquired spatial information;
based on the identified object being a prestored subject to be avoided, controlling the driving state of the robot cleaner to avoid the object; and based on the identified object not being the prestored subject to be avoided, controlling the driving state of the robot cleaner to run over the object.

\* \* \* \* \*